United States Patent
Kim et al.

(10) Patent No.: US 11,030,432 B2
(45) Date of Patent: Jun. 8, 2021

(54) DEFORMABLE FINGERPRINT RECOGNITION DEVICE, AND FINGERPRINT AUTHENTICATION METHOD AND ELECTRONIC APPARATUS USING THE SAME

(71) Applicant: SAMSUNG ELECTRONICS CO., LTD., Suwon-si (KR)

(72) Inventors: Hyunjoon Kim, Seoul (KR); Jingu Heo, Yongin-si (KR); Dongkyun Kim, Suwon-si (KR); Seokwhan Chung, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 54 days.

(21) Appl. No.: 16/654,156

(22) Filed: Oct. 16, 2019

(65) Prior Publication Data

US 2020/0125817 A1 Apr. 23, 2020

(30) Foreign Application Priority Data

Oct. 23, 2018 (KR) .................. 10-2018-0126868

(51) Int. Cl.
*G06K 9/20* (2006.01)
*G06K 9/00* (2006.01)
(Continued)

(52) U.S. Cl.
CPC ........... *G06K 9/0002* (2013.01); *G06K 9/036* (2013.01); *G06K 9/209* (2013.01); *G01L 1/146* (2013.01); *G01L 1/16* (2013.01); *G01L 1/205* (2013.01)

(58) Field of Classification Search
CPC ........... G06K 9/0002; G06K 9/00006–9/0012; G06K 9/03–9/036
See application file for complete search history.

(56) References Cited

U.S. PATENT DOCUMENTS

| 7,706,581 B2 | 4/2010 | Drews et al. |
| 2003/0068072 A1 | 4/2003 | Hamid |

(Continued)

FOREIGN PATENT DOCUMENTS

| JP | 2009-87263 A | 4/2009 |
| KR | 10-2016-0139297 A | 12/2016 |
| KR | 10-2017-0096872 A | 8/2017 |

OTHER PUBLICATIONS

Communication dated Mar. 19, 2020 from the European Patent Office in application No. 19204589.6.

(Continued)

*Primary Examiner* — Brian Werner
(74) *Attorney, Agent, or Firm* — Sughrue Mion, PLLC

(57) ABSTRACT

Provided are a deformable fingerprint recognition device and a fingerprint authentication method and an electronic apparatus using the deformable fingerprint recognition device. The deformable fingerprint recognition device may include a fingerprint sensor configured to be deformed in shape and a strain sensor provided on a surface of the fingerprint sensor to measure deformation distribution of the fingerprint sensor. The deformable fingerprint recognition device may recognize a fingerprint of a user by reflecting the deformation distribution of the fingerprint sensor measured by the strain sensor. The deformable fingerprint recognition device may include a plurality of first pixel regions to detect the fingerprint of the user, and the strain sensor may include a plurality of second pixel regions to measure the deformation distribution of the fingerprint sensor.

21 Claims, 23 Drawing Sheets

(51) Int. Cl.
    *G06K 9/03*    (2006.01)
    *G01L 1/14*    (2006.01)
    *G01L 1/16*    (2006.01)
    *G01L 1/20*    (2006.01)

(56) References Cited

U.S. PATENT DOCUMENTS

| | | |
|---|---|---|
| 2007/0279617 A1 | 12/2007 | Sherman |
| 2008/0166028 A1 | 7/2008 | Turek et al. |
| 2008/0317293 A1 | 12/2008 | Sakurai et al. |
| 2018/0137801 A1 | 5/2018 | An |
| 2018/0150679 A1 | 5/2018 | Kim et al. |
| 2019/0213377 A1* | 7/2019 | Miller .................. G06K 9/0002 |

OTHER PUBLICATIONS

Sun et al., "Active Matrix Electronic Skin Strain Sensor Based on Piezopotential-Powered Graphene Transistors", Advanced Materials, 27, 2015, pp. 3411-3417, 7 pages total.

Sarwar et al., "Bend, stretch, and touch: Locating a finger on an actively deformed transparent sensor array", Science Advances, 3, e1602200, Mar. 15, 2017, pp. 1-8, 9 pages total.

AlShehri et al., "A Large-Scale Study of Fingerprint Matching Systems for Sensor Interoperability Problem", Sensors, 18, 1008, Mar. 28, 2018, pp. 1-18, 18 pages total.

Ross et al., "Estimating Fingerprint Deformation", Proc. of International Conference on Biometric Authentication (ICBA), LNCS vol. 3072, Jul. 2004, pp. 249-255, 8 pages total.

\* cited by examiner

<BEFORE DEFORMATION>

<DEFORMATION>

<BEFORE DEFORMATION>

<DEFORMATION>

DEFORMABLE FINGERPRINT RECOGNITION DEVICE, AND FINGERPRINT AUTHENTICATION METHOD AND ELECTRONIC APPARATUS USING THE SAME

CROSS-REFERENCE TO RELATED APPLICATION

This application claims priority from Korean Patent Application No. 10-2018-0126868, filed on Oct. 23, 2018, in the Korean Intellectual Property Office, the disclosure of which is incorporated herein by reference in its entirety.

BACKGROUND

1. Field

Apparatuses and methods consistent with example embodiments relate to a fingerprint recognition device, a fingerprint authentication method, and an electronic apparatus including the fingerprint recognition device.

2. Description of the Related Art

In recent years, there has been growing interest in flexible electronic apparatuses and stretchable electronic apparatuses. Flexible electronics is technology for implementing a bendable or foldable electronic circuit/apparatus by mounting electronic devices on a flexible substrate such as a plastic substrate. Stretchable electronic apparatuses are stretchable as well as bendable, and stretchable electronics is expected to become technology enabling new applications of electronic devices.

Various flexible/stretchable sensors and electric apparatuses that are attachable to the skin or freely deformable have been researched/developed. In addition, a person authentication function using personal characteristics such as fingerprints, voices, faces, and irises may be used in various mobile devices and electronic apparatuses. When developing flexible or stretchable electronic apparatuses, it may be required to research person authentication methods for the flexible or stretchable electronic apparatuses.

SUMMARY

One or more example embodiments provide a deformable fingerprint recognition device capable of easily/accurately recognizing a fingerprint of a user even when the deformable fingerprint recognition device is used in a flexible/stretchable apparatus.

Further, one or more example embodiments provide a deformable fingerprint recognition device capable of easily/accurately recognizing a fingerprint of a user even when an electronic apparatus is deformed.

Still further, one or more example embodiments provide a fingerprint authentication method using a flexible/stretchable fingerprint recognition device.

Still further, one or more example embodiments provide an electronic apparatus including a deformable fingerprint recognition device.

Additional aspects will be set forth in part in the description which follows and, in part, will be apparent from the description, or may be learned by practice of the presented embodiments.

According to an aspect of an embodiment, a deformable fingerprint recognition device includes: a fingerprint sensor configured to be deformable in shape; and a strain sensor provided on a surface of the fingerprint sensor and configured to measure deformation distribution of the fingerprint sensor, wherein the deformable fingerprint recognition device is configured to recognize a fingerprint of a user based on a fingerprint detection of the fingerprint sensor and the deformation distribution of the fingerprint sensor measured by the strain sensor.

The fingerprint sensor may include a plurality of first pixel regions to detect the fingerprint of the user, and the strain sensor may include a plurality of second pixel regions to measure the deformation distribution, wherein each of the plurality of second pixel regions may correspond to an n×m matrix array of the plurality of first pixel regions, where n refers to an integer equal to or greater than 1, and m refers to an integer equal to or greater than 1.

Each of the plurality of second pixel regions may correspond to at least two of the plurality of first pixel regions.

The plurality of second pixel regions may be arranged to entirely cover the plurality of first pixel regions.

The plurality of second pixel regions may be arranged to selectively correspond to some of the plurality of first pixel regions, and at least some of the plurality of second pixel regions may be apart from each other.

The fingerprint sensor may include capacitive fingerprint sensor.

The strain sensor may include one of a capacitive strain sensor, a resistive strain sensor, and a piezoelectric strain sensor.

The fingerprint sensor may include a plurality of first electrodes and a plurality of second electrodes crossing the plurality of first electrodes, and a plurality of first pixel regions may be defined by cross points between the plurality of first electrodes and the plurality of second electrodes.

The strain sensor may include a plurality of third electrodes and a plurality of fourth electrodes crossing the plurality of third electrodes, and a plurality of second pixel regions may be defined by cross points between the plurality of third electrodes and the plurality of fourth electrodes.

The plurality of first electrodes may be first transmit (Tx) electrodes, the plurality of third electrodes may be second transmit (Tx) electrodes, and at least one of the plurality of first electrodes and at least one of the plurality of third electrodes may be electrically connected to each other.

The plurality of first electrodes or the plurality of second electrodes may be arranged with a first interval therebetween, the plurality of third electrodes or the plurality of fourth electrodes may be arranged with a second interval therebetween, and the second interval may be equal to or greater than the first interval.

The plurality of first electrodes and the plurality of second electrodes may include a plurality of rhombus pattern portions and connection portions between the plurality of rhombus pattern portions.

The plurality of first electrodes may include a plurality of rhombus pattern portions and connection portions between the plurality of rhombus pattern portions, and the plurality of second electrodes may include a plurality of electrode lines.

The plurality of first electrodes and the plurality of second electrodes may include a plurality of electrode lines.

At least one of the plurality of first electrodes and the plurality of second electrodes may have a serpentine shape.

The deformable fingerprint recognition device may further include a shield layer disposed between the fingerprint sensor and the strain sensor.

The fingerprint sensor may be placed above the strain sensor, and a cover film may cover the fingerprint sensor and may be configured to recognize the fingerprint of the user when the cover film is touched by the user.

The deformable fingerprint recognition device may be a stretchable device.

The deformable fingerprint recognition device may be a flexible or bendable device.

According to an aspect of another embodiment, an electronic apparatus includes the deformable fingerprint recognition device.

According to an aspect of another embodiment, a deformable fingerprint recognition device includes: a fingerprint sensor including a plurality of first electrodes, a plurality of second electrodes crossing the plurality of first electrodes, and a plurality of first pixel regions defined by cross points between the plurality of first electrodes and the plurality of second electrodes for recognizing a fingerprint of a user; and a strain sensor provided on a surface of the fingerprint sensor and including a plurality of second pixel regions to measure deformation distribution of the fingerprint sensor, wherein each of the plurality of second pixel regions corresponds to n×m of the plurality of first pixel regions, where n refers to an integer equal to or greater than 1 and m refers to an integer equal to or greater than 1, and the deformable fingerprint recognition device is configured to recognize the fingerprint of the user by reflecting the deformation distribution of the fingerprint sensor measured by the strain sensor.

Each of the plurality of second pixel regions may correspond to at least two of the plurality of first pixel regions.

The plurality of second pixel regions may be arranged to entirely cover the plurality of first pixel regions.

The plurality of second pixel regions may be arranged to selectively correspond to some of the plurality of first pixel regions.

The strain sensor may include one of a capacitive strain sensor, a resistive strain sensor, and a piezoelectric strain sensor.

According to an aspect of another example embodiment, there is provided a deformable fingerprint recognition device including: a fingerprint sensor including a plurality of first electrodes and a plurality of second electrodes crossing the plurality of first electrodes, and configured to detect a fingerprint of a user from cross points between the plurality of first electrodes and the plurality of second electrodes; a strain sensor disposed on the fingerprint sensor to measure deformation distribution of the fingerprint sensor; and a processor configured to correct the fingerprint detected by the fingerprint sensor based on the deformation distribution of the fingerprint sensor.

The fingerprint sensor may include a plurality of first pixel regions located at the cross points between the plurality of first electrodes and the plurality of second electrodes. The strain sensor may include a plurality of second pixel regions. Each of the plurality of second pixel regions may correspond to at least two of the plurality of first pixel regions and may be configured to measure the deformation distribution from the corresponding at least two of the plurality of first pixel regions.

The plurality of first electrodes may be disposed in a first direction, and the plurality of second electrodes may be disposed in a second direction perpendicular to the first direction. The plurality of first electrodes and the plurality of second electrodes may be alternately disposed in a direction oblique to the first direction and the second direction.

According to an aspect of another embodiment, there is provided a fingerprint authentication method using a deformable fingerprint recognition device, the deformable fingerprint recognition device including a fingerprint sensor configured to be deformable in shape, and a strain sensor disposed on the fingerprint sensor, the fingerprint authentication method including: acquiring information about a fingerprint of a user from a fingerprint sensor; measuring deformation distribution of the fingerprint sensor using a strain sensor; and correcting the information about the fingerprint of the user based on the deformation distribution of the fingerprint sensor.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
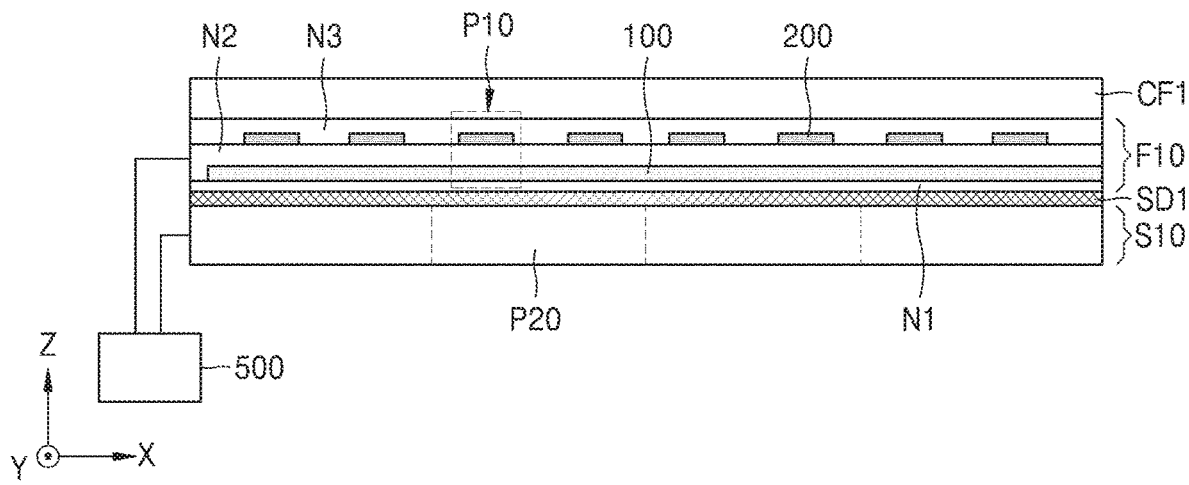
FIG. 1 is a cross-sectional view illustrating a deformable fingerprint recognition device according to an embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Various example embodiments will now be described more fully with reference to the accompanying drawings in which example embodiments are shown.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, deformable fingerprint recognition devices, fingerprint authentication methods using the deformable fingerprint recognition devices, and electronic apparatuses including the deformable fingerprint recognition devices will be described according to embodiments with reference to the accompanying drawings. In the drawings, the widths and thicknesses of layers or regions may be exaggerated for clarity or ease of description. In the following description, like reference numerals refer to like elements throughout.

FIG. 1 is a cross-sectional view illustrating a deformable fingerprint recognition device according to an embodiment.

Referring to FIG. 1, the deformable fingerprint recognition device according to the embodiment may include a deformable fingerprint sensor F10 having a deformable shape and a strain sensor S10 configured to measure the distribution of deformation of the fingerprint sensor F10. The strain sensor S10 may be provided on a surface (a lower surface in FIG. 1) of the fingerprint sensor F10. The strain sensor S10 may measure the distribution of deformation of the fingerprint sensor F10 based on the distribution of deformation of the strain sensor S10 itself. The distribution of deformation of the strain sensor S10 may be the same or substantially the same as the distribution of deformation of the fingerprint sensor F10. Therefore, it may be considered that the distribution of deformation of the strain sensor S10 corresponds to the distribution of deformation of the fingerprint sensor F10. The deformable fingerprint recognition device of the present embodiment may be configured to recognize a user's fingerprint by reflecting the distribution of deformation of the fingerprint sensor F10 measured by the strain sensor S10.

The fingerprint sensor F10 may include a plurality of first pixel regions P10 to sense a user's fingerprint. Here, the first pixel regions P10 may be referred to as first unit sensing regions. The fingerprint sensor F10 may be a capacitive fingerprint sensor. In this case, the fingerprint sensor F10 may include a plurality of first electrodes 100 extending in a first direction and a plurality of second electrodes 200 extending in a second direction that is perpendicular to the first direction. The plurality of second electrodes 200 may intersect with the plurality of first electrodes 100, and the plurality of first pixel regions P10 may be defined by cross points between the plurality of first electrodes 100 and the plurality of second electrodes 200. Only one first electrode 100 is illustrated in FIG. 1. However, the present embodiment is not limited thereto, and the plurality of first electrodes 100 may be arranged in parallel to each other and apart from each other. The plurality of second electrodes 200 crossing the plurality of first electrodes 100 above the first electrodes 100 may be arranged in parallel to each other and apart from each other. The fingerprint sensor F10 includes first, second, and third dielectric layers N1, N2, and N3. The first to third dielectric layers N1, N2, and N3 may be insulating layers.

The strain sensor S10 may include a plurality of second pixel regions P20 to measure deformation distribution. The plurality of second pixel regions P20 may be referred to as second unit sensing regions. The plurality of second pixel regions P20 may form a two-dimensional array. Each of the plurality of second pixel regions P20 may correspond to n×m first pixel regions P10, where n refers to an integer equal to or greater than 1 and m refers to an integer equal to or greater than 1. Each of the plurality of second pixel regions P20 may correspond to at least two first pixel regions P10. When each of the plurality of second pixel regions P20 corresponds to at least two first pixel regions P10, the plurality of second pixel regions P20 may be easily configured/formed.

The deformable fingerprint recognition device according to the embodiment may further include a shield layer SD1 between the fingerprint sensor F10 and the strain sensor S10. The shield layer SD1 is a layer having an electrical shielding effect, and owing to the shield layer SD1, variations in electrical properties of the fingerprint sensor F10 caused by a user's fingerprint may not affect the strain sensor S10. The shield layer SD1 may not be provided depending on the structure of the strain sensor S10. The fingerprint sensor F10 may be placed above the strain sensor S10, and a cover film CF1 may be further provided to cover the fingerprint sensor F10. The cover film CF1 may include a polymer. A fingerprint of a user touching the cover film CF1 may be recognized by the deformable fingerprint recognition device.

The deformable fingerprint recognition device according to the embodiment may further include a processor 500 connected to the strain sensor S10 and the fingerprint sensor F10. The processor 500 may be also referred to as "microprocessor" and may include a central processing unit (CPU). The processor 500 may be connected to the plurality of second pixel regions P20 of the strain sensor S10. In addition, the processor 500 may be connected to the plurality of first electrodes 100 and the plurality of second electrodes 200 of the fingerprint sensor F10. The processor 500 may be configured to correct or standardize fingerprint information measured by the fingerprint sensor F10 based on data about the distribution and degree of deformation measured by the strain sensor S10. To this end, an algorithm for correcting fingerprint images based on deformation distribution may be applied to the processor 500.

The deformable fingerprint recognition device according to the embodiment may be a stretchable and/or bendable device. For example, the deformable fingerprint recognition device may be a stretchable device having a strain of about 5% or greater or about 10% or greater. When the deformable fingerprint recognition device is a stretchable device, a correction effect obtained by using the strain sensor S10 may be effectively used. Alternatively, the deformable fingerprint recognition device according to the embodiment may be a flexible device or a bendable device.

According to the embodiment, the plurality of second pixel regions P20 may be arranged to cover (from below) all of the plurality of first pixel regions P10. According to another embodiment, the plurality of second pixel regions P20 may be arranged such that the plurality of second pixel regions P20 may selectively correspond to (may cover from below) some of the plurality of first pixel regions P10. In this case, at least some of the plurality of second pixel regions P20 may be apart from each other.

Figure 2:
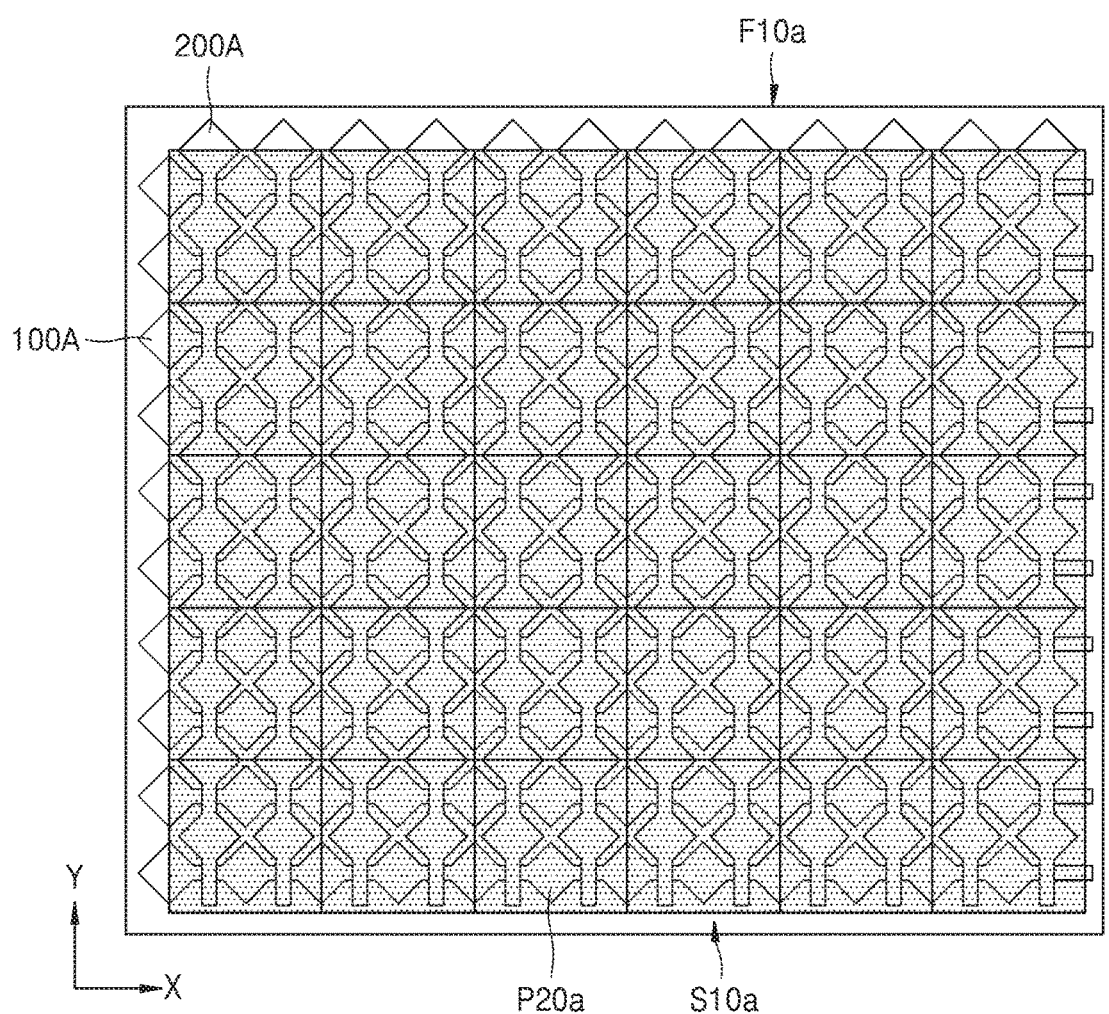
FIG. 2 is a plan view illustrating a deformable fingerprint recognition device according to an embodiment.

FIG. 2 is a plan view illustrating a deformable fingerprint recognition device according to an embodiment.

Referring to FIG. 2, the deformable fingerprint recognition device may include a fingerprint sensor F10a, and the fingerprint sensor F10a may include a plurality of first electrodes 100A and a plurality of second electrodes 200A crossing the plurality of first electrodes 100A. A plurality of first pixel regions may be defined by cross points between the plurality of first electrodes 100A and the plurality of second electrodes 200A. In addition, the deformable fingerprint recognition device may include a strain sensor S10a provided on a surface of the fingerprint sensor F10a. The strain sensor S10a may include a plurality of second pixel regions P20a. The plurality of second pixel regions P20a may be arranged to cover all of the plurality of first pixel regions (cover all the cross points). Although it is illustrated that one second pixel region P20a corresponds four first pixel regions, the number of first pixel regions corresponding to one second pixel region P20a may vary. Here, for ease of illustration, it is illustrated that the strain sensor S10a is placed above the fingerprint sensor F10a. In practice, however, the fingerprint sensor F10a may be placed above the strain sensor S10a. This also applies to FIGS. 3 and 4.

Figure 3:
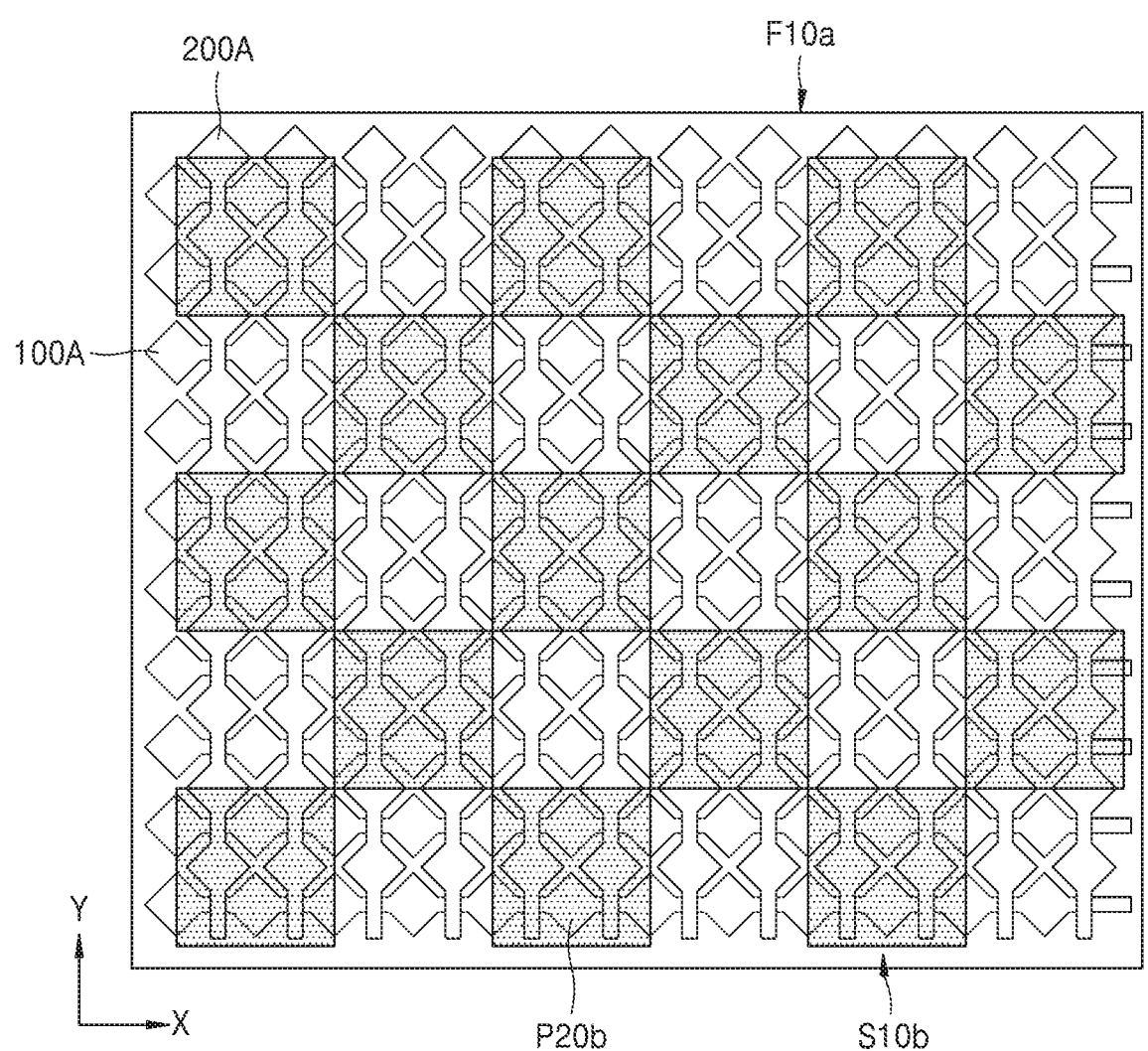
FIG. 3 is a plan view illustrating a deformable fingerprint recognition device according to another embodiment.

FIG. 3 is a plan view illustrating a deformable fingerprint recognition device according to another embodiment.

Referring to FIG. 3, a strain sensor S10b may include a plurality of second pixel regions P20b. The plurality of second pixel regions P20b may be arranged in such a manner that the plurality of second pixel regions 20b may selectively correspond to some of a plurality of first pixel regions (cross points). In this case, at least some of the plurality of second pixel regions P20b may be apart from each other. In addition, at least one first pixel region may be exposed between two adjacent second pixel regions P20b. The arrangement of the plurality of second pixel regions P20b shown in FIG. 3 may be modified as illustrated in FIG. 4.

Figure 4:
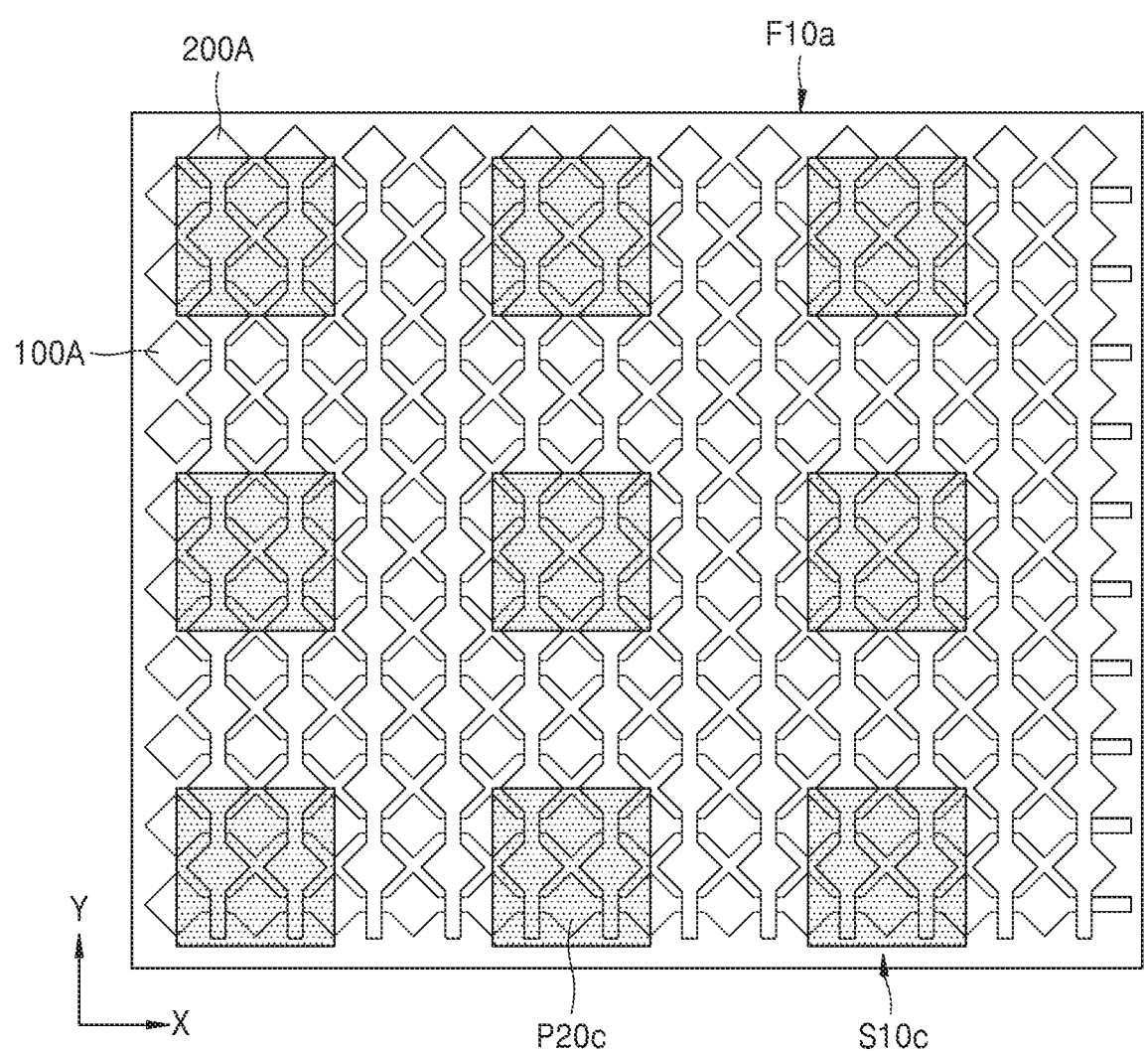
FIG. 4 is a plan view illustrating a deformable fingerprint recognition device according to another embodiment.

Referring to FIG. 4, a strain sensor S10c may include a plurality of second pixel regions P20c, and the plurality of second pixel regions P20c may be arranged in such a manner that the plurality of second pixel regions P20c may selectively correspond to some of the first pixel regions (cross points) of the fingerprint sensor F10a. The plurality of second pixel regions P20c may be apart from each other.

As illustrated in FIGS. 3 and 4, when the plurality of second pixel regions P20b or P20c are sparsely arranged, it is easy to ensure spaces between the plurality of second pixel regions P20b or P20c, and thus the strain sensor S10b or S10c may easily be constructed. Furthermore, in this case, the distribution and degree of deformation in regions between the plurality of second pixel regions P20b or P20c adjacent to each other may be estimated by an interpolation method. Therefore, even when the plurality of second pixel regions P20b or P20c are sparsely arranged, the deformation distribution of the entire deformable fingerprint recognition device may be measured.

Figure 5A:
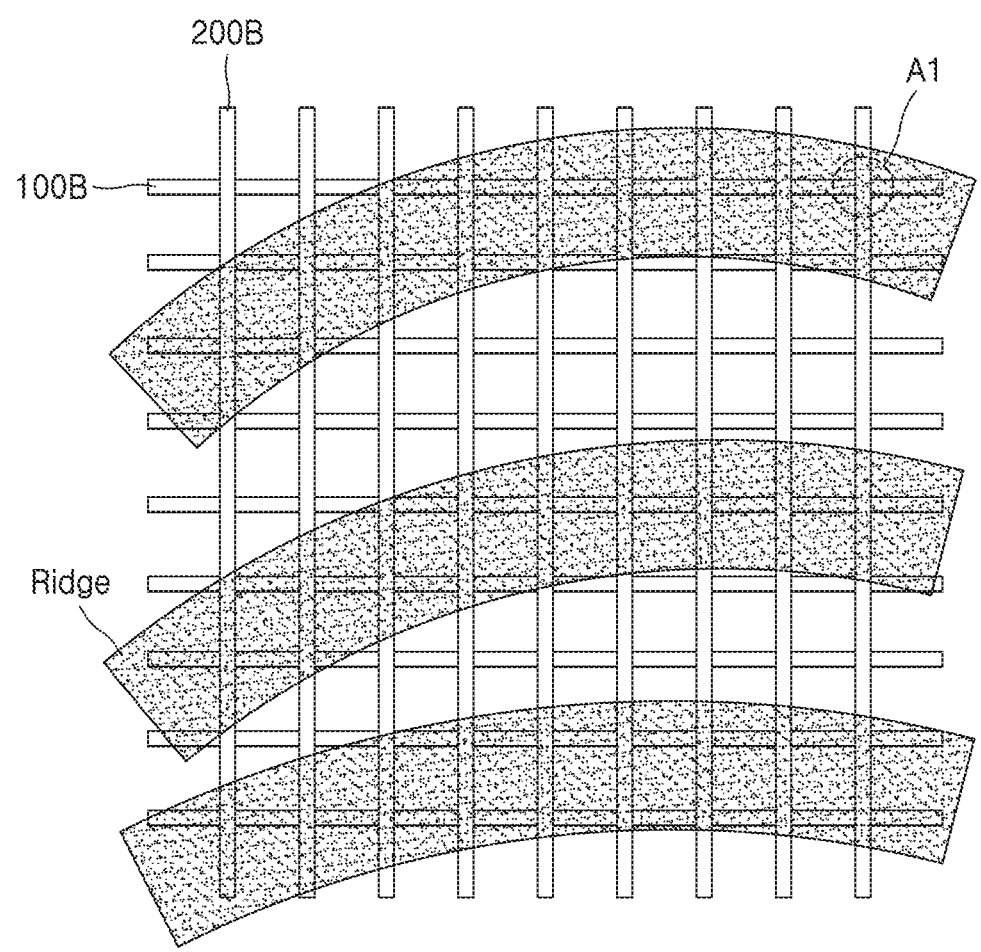
FIGS. 5A and 5B are plan views illustrating a deformable (stretchable) fingerprint sensor before and after deformation.
Figure 5B:
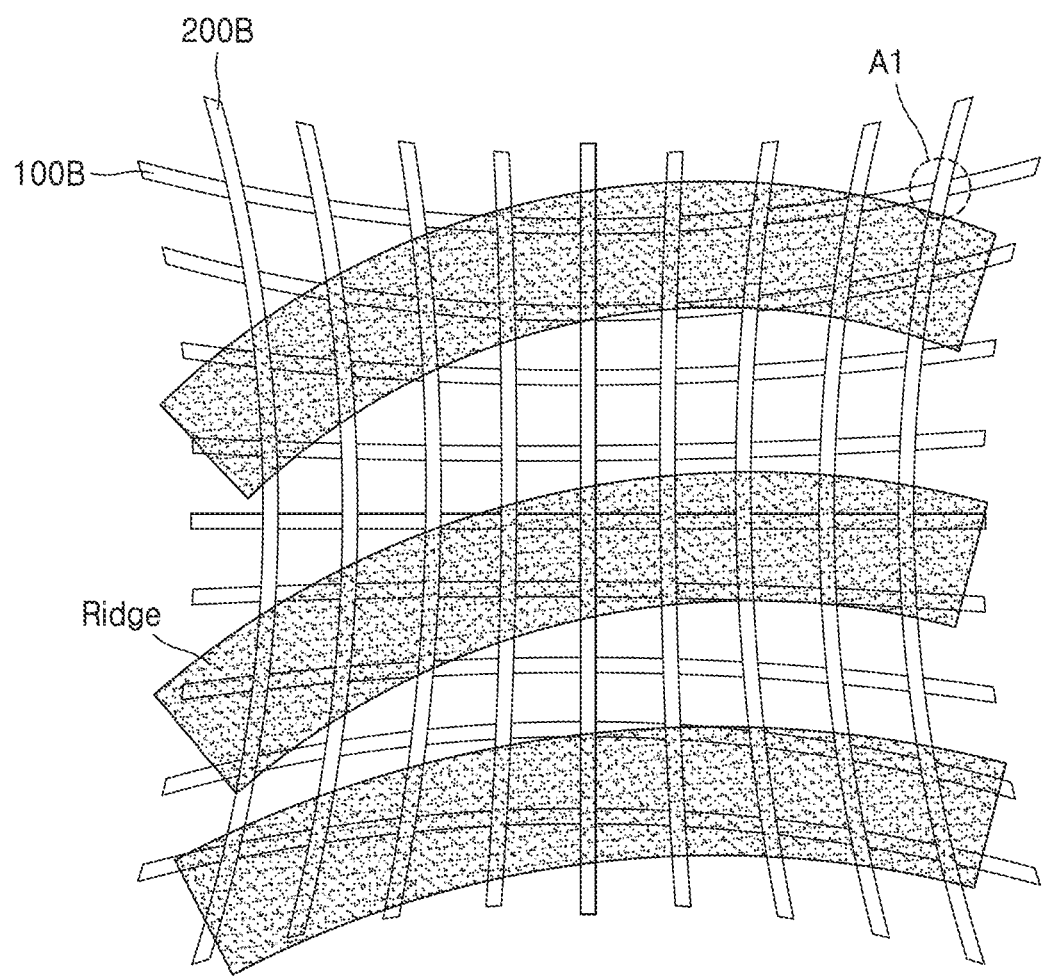

FIGS. 5A and 5B are plan views illustrating a deformable (stretchable) fingerprint sensor before and after deformation. FIG. 5A illustrates an electrode pattern without deformation, and FIG. 5B illustrates the electrode pattern in a deformed state. In addition, FIGS. 5A and 5B also illustrate a fingerprint pattern corresponding to ridges of a user's fingerprint.

Referring to FIGS. 5A and 5B, the fingerprint sensor includes a plurality of first electrodes 100B and a plurality of second electrodes 200B crossing the plurality of first electrodes 100B. When the fingerprint sensor is deformed, since the intervals between the plurality of first and second electrodes 100B and 200B are not uniformly varied, a distorted fingerprint image is recognized. For example, a pixel corresponding to a point A1 may be recognized as black without deformation as shown in FIG. 5A, and may be recognized as white or nearly white when the fingerprint sensor is deformed as shown in FIG. 5B.

Figure 6A:
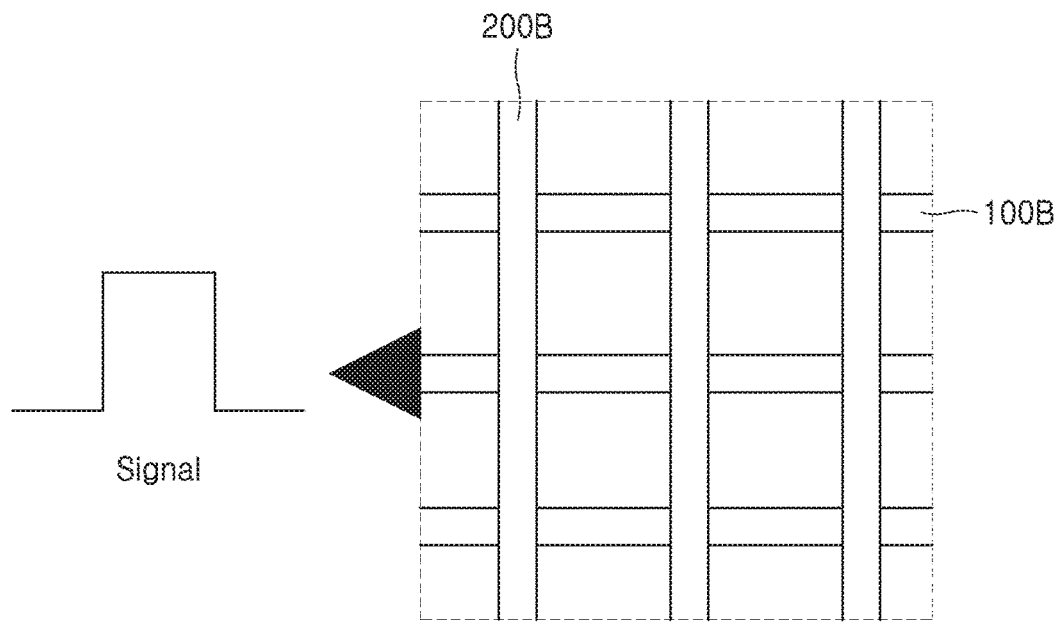
FIGS. 6A and 6B are plan views illustrating a deformable (stretchable) fingerprint sensor before and after deformation.
Figure 6B:
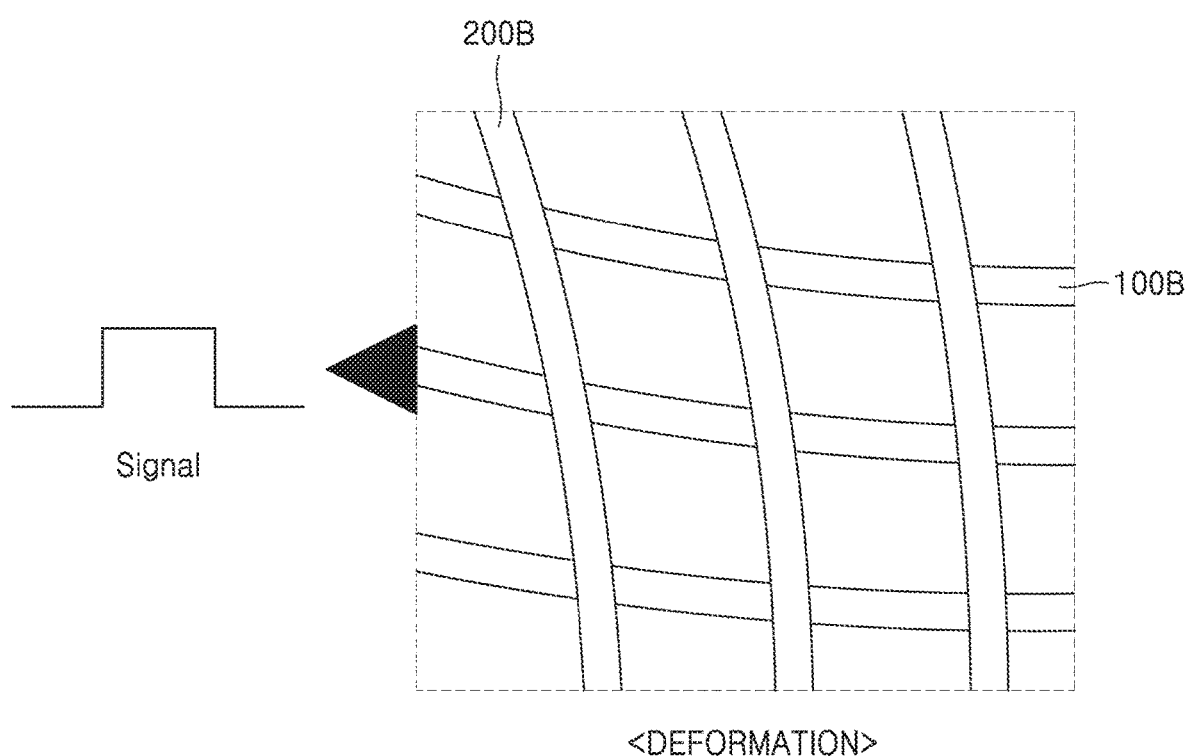

FIGS. 6A and 6B are plan views illustrating a deformable (stretchable) fingerprint sensor before and after deformation. FIG. 6A illustrates an electrode pattern without deformation, and FIG. 6B illustrates the electrode pattern in a deformed state.

Referring to FIGS. 6A and 6B, when the fingerprint sensor is deformed, the intensity of a signal detected at a cross point (pixel) may be varied because the intervals between electrodes are varied.

As described with reference to FIGS. 5A to 6B, when a fingerprint sensor is deformed, a markedly distorted fingerprint image may be recognized due to the deformation. In one or more of the embodiments, the distribution and degree of deformation of the fingerprint sensor divided into a plurality of pixel regions may be measured using the strain sensor S10a, S10b, S10c, and detected fingerprint information (fingerprint image) may be corrected or standardized by reflecting the distribution and degree of deformation of the fingerprint sensor, thereby guaranteeing accurate fingerprint recognition. Therefore, even when the fingerprint sensor is deformed, it may be possible to compare a stored fingerprint image with a measured fingerprint image and authenticate the measured fingerprint image. Effective authentication may be possible using a standardized (corrected) fingerprint image regardless of the degree of deformation or state of the fingerprint sensor.

Figure 7:
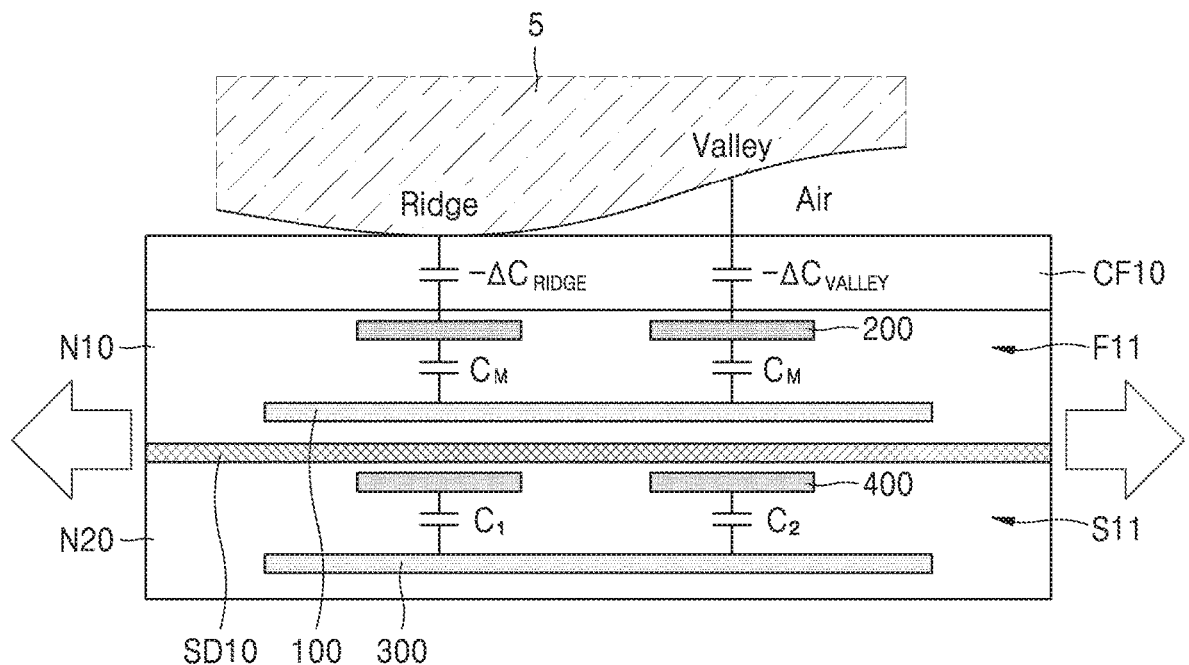
FIG. 7 is a cross-sectional view illustrating a deformable fingerprint recognition device according to another embodiment.

The strain sensor S10a, S10b, S10c used in one or more of the embodiments may be, for example, any one of a capacitive strain sensor, a resistive strain sensor, and a piezoelectric strain sensor. The resistive strain sensor may include an insulating flexible backing, and a metallic foil pattern boded to the backing. When the metallic foil pattern is deformed, the deformation causes the electrical resistance of the metallic foil pattern to change. The resistive strain sensor may determine an amount of strain based on the changed in resistance caused by the deformation, and the resistance of the undeformed resistive metallic foil pattern. However, the strain sensor S10a, S10b, S10c is not limited thereto. FIG. 7 illustrates an example in which a capacitive strain sensor is used.

FIG. 7 is a cross-sectional view illustrating a deformable fingerprint recognition device according to another embodiment.

Referring to FIG. 7, a deformable fingerprint sensor F11 may be provided, and a strain sensor S11 may be provided on a lower surface of the deformable fingerprint sensor F11. A shield layer SD10 may be provided between the fingerprint sensor F11 and the strain sensor S11, and a cover film CF10 may be provided on the fingerprint sensor F11. A fingerprint may be recognized from a finger 5 of a user touching the cover film CF10.

The fingerprint sensor F11 may include a plurality of first electrodes 100 and a plurality of second electrodes 200 crossing the plurality of first electrodes 100. The plurality of first electrodes 100 may be apart from each other in parallel to each other, and the plurality of second electrodes 200 may be apart from each other in parallel to each other. A plurality of first pixel regions may be defined by cross points between the plurality of first electrodes 100 and the plurality of second electrodes 200. Since capacitance is different in valley and ridge regions of the finger 5, fingerprint information (image) may be obtained based on the difference. In other words, capacitance reduces by $-\Delta C_{RIDGE}$ in the ridge region and $-\Delta C_{VALLEY}$ in the valley region, and thus information about a valley and a ridge may be obtained from the difference between $-\Delta C_{RIDGE}$ and $-\Delta C_{VALLEY}$. In addition, $C_M$ refers to mutual capacitance between a first electrode 100 and a second electrode 200.

The strain sensor S11 may include a plurality of third electrodes 300 and a plurality of fourth electrodes 400 crossing the plurality of third electrodes 300. The plurality of third electrodes 300 may be apart from each other and may be disposed in parallel to each other. The plurality of fourth electrodes 400 may be apart from each other and may be disposed in parallel to each other. A plurality of second pixel regions may be defined by cross points between the plurality of third electrodes 300 and the plurality of fourth electrodes 400. The intervals between the plurality of third electrodes 300 and the plurality of fourth electrodes 400 may vary depending on the distribution and degree of deformation of the deformable fingerprint recognition device, and consequently the capacitances C1 and C2 between the plurality of third and fourth electrodes 300 and 400 may vary. The distribution and degree of deformation of the deformable fingerprint recognition device may be measured based on variations in capacitance.

In FIG. 7, the interval between the plurality of second electrodes 200 is equal to the interval between the plurality of fourth electrodes 400. In addition, the interval between the plurality of first electrodes 100 may be equal to the interval between the plurality of third electrodes 300. In another embodiment, the interval between the plurality of third electrodes 300 may be greater than the interval between the plurality of first electrodes 100, and the interval between the plurality of fourth electrodes 400 may be greater than the interval between the plurality of second electrodes 200. In this case, it may be easier to construct the strain sensor S11.

In FIG. 7, a first dielectric N10 and a second dielectric N20 are illustrated. Although the first dielectric N10 and the second dielectric N20 are simply illustrated without distinguishing layers, the first dielectric N10 and the second dielectric N20 may have a multi-layer structure.

Since the distance between the plurality of first electrodes 100 and the plurality of second electrodes 200, the distance between the plurality of third electrodes 300 and the plurality of fourth electrodes 400, and the thickness of the shield layer SD10 are all small within the range of several micrometers (μm) or less, the fingerprint sensor F11 and the strain sensor S11 may be macroscopically considered as one layer (same layer). Therefore, the deformation of the fingerprint sensor F11 and the deformation of the strain sensor S11 may be substantially the same. Even when there is a slight difference between the deformation of the fingerprint sensor F11 and the deformation of the strain sensor S11, the slight difference may be compensated for by a data processing method.

The plurality of first electrodes 100 may be first transmit (Tx) electrodes, and the plurality of second electrodes 200 may be first receive (Rx) electrodes. In addition, the plurality of third electrodes 300 may be second transmit (Tx) electrodes, and the plurality of fourth electrodes 400 may be second receive (Rx) electrodes. In this case, at least one of the plurality of first electrodes 100 (Tx electrodes) and at least one of the plurality of third electrodes 300 (Tx electrodes) corresponding thereto may be electrically connected to each other and may be simultaneously driven. An example thereof is illustrated in FIG. 8.

Figure 8:
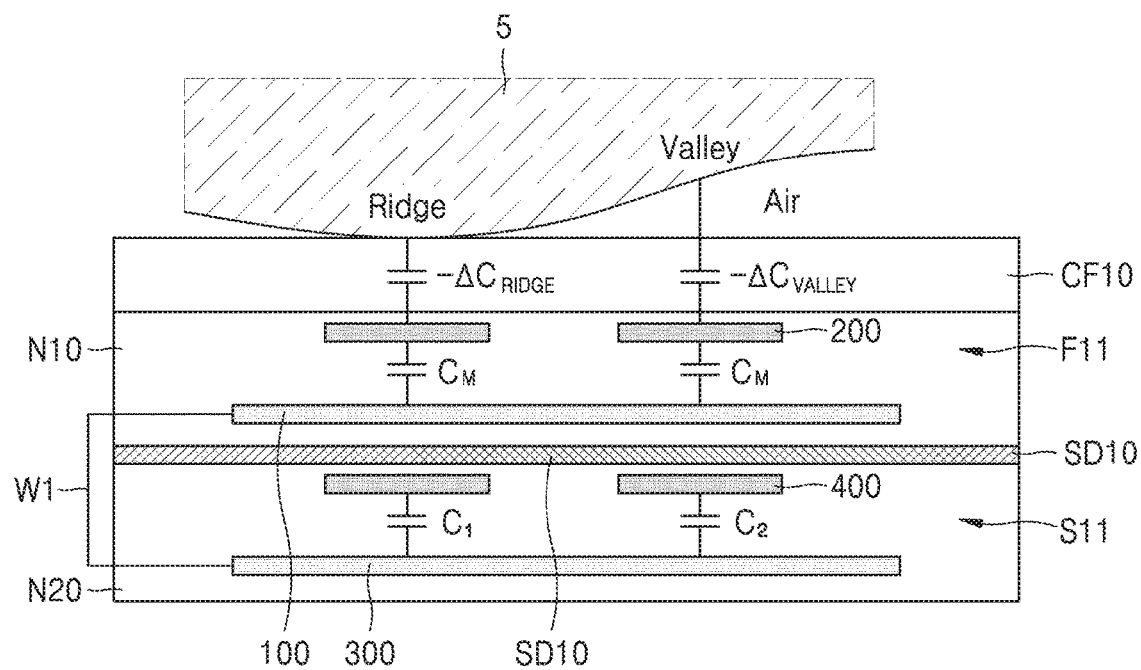
FIG. 8 is a cross-sectional view illustrating a deformable fingerprint recognition device according to another embodiment.

Referring to FIG. 8, a first electrode 100 (Tx electrode) and a corresponding third electrode 300 (Tx electrode) may be electrically connected to each other through a connection wire W1 and may be simultaneously driven.

Figure 9:
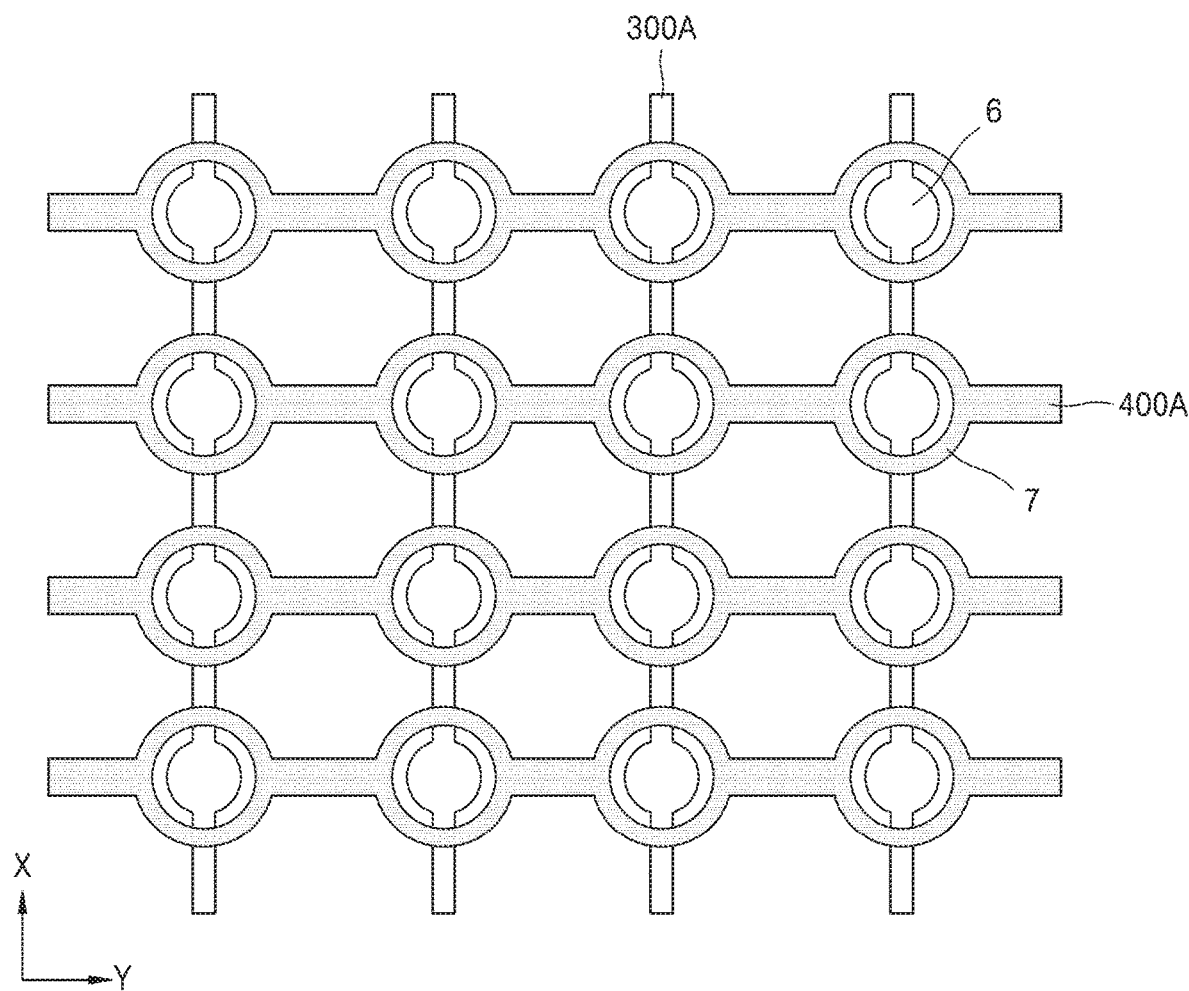
FIG. 9 is a plan view illustrating a strain sensor that may be applied to a deformable fingerprint recognition device according to another embodiment.

FIG. 9 is a plan view illustrating a strain sensor that may be applied to a deformable fingerprint recognition device according to another embodiment. FIG. 9 illustrates an example planar structure of electrodes of a capacitive strain sensor.

Referring to FIG. 9, a plurality of third electrodes 300A may extend in a first direction and may be apart from each other and in parallel to each other. A plurality of fourth electrodes 400A may extend above the plurality of third electrodes 300A in a second direction crossing the first direction, and the plurality of fourth electrodes 400A may be apart from each other and in parallel to each other. A plurality of cross point portions may be placed between the plurality of third electrodes 300A and the plurality of fourth electrodes 400A. The plurality of third electrodes 300A may include circular enlarged portions 6 extending from the cross point portions, and the plurality of fourth electrodes 400A may include annular portions 7 surrounding the enlarged portions 6 at the cross point portions. When the plurality of third electrodes 300A and the plurality of fourth electrodes 400A have these shapes, it may be easier to measure the distribution of deformation based on variations in capacitance. However, the shapes of the plurality of third electrodes 300A and the plurality of fourth electrodes 400A may be changed in other example embodiments.

Figure 10A:
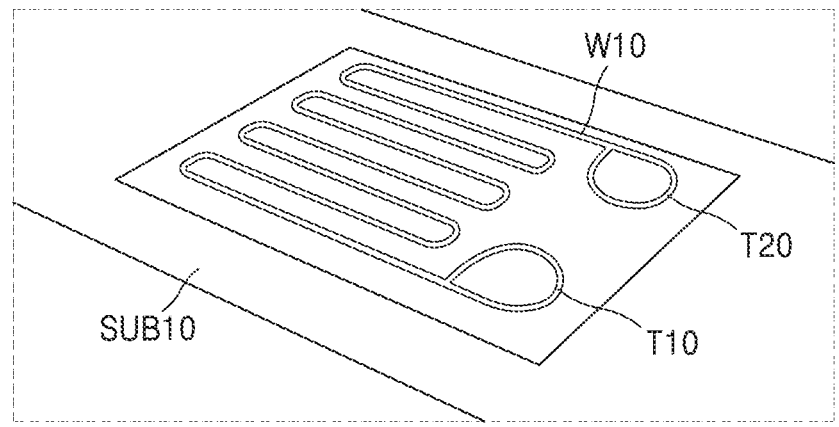
FIGS. 10A, 10B, and 10C are perspective views illustrating a strain sensor that may be applied to a deformable fingerprint recognition device according to another embodiment.
Figure 10B:
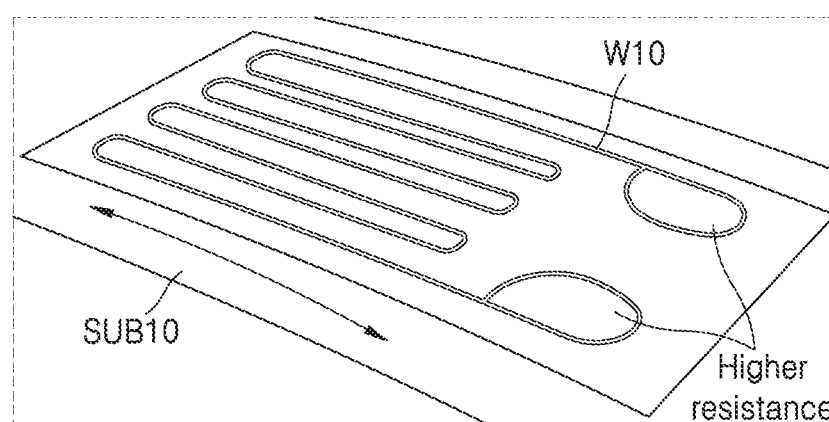
Figure 10C:
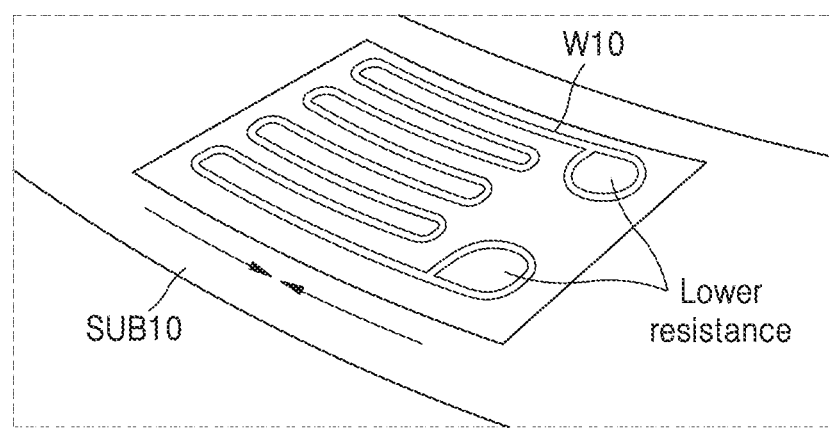

FIGS. 10A to 10C are perspective views illustrating a strain sensor that may be applied to a deformable fingerprint recognition device according to another embodiment. FIG. 10A to 10C illustrate a basic structure of a resistive strain sensor.

Referring to FIG. 10A, a wiring pattern W10 may be provided on a substrate SUB10, and first and second terminal portions T10 and T20 may be provided at both ends of the wiring pattern W10. Referring to FIG. 10B, when the strain sensor is subjected to tensile deformation, the resistance between the first and second terminal portions T10 and T20 may increase. Referring to FIG. 10C, when the strain sensor is subjected to compression deformation, the resistance between the first and second terminal portions T10 and T20 may decrease. Therefore, the degree of deformation of the deformable fingerprint recognition device may be measured by using the resistive strain sensor as illustrated in FIG. 10A to 10C.

FIGS. 11A to 11D are plan views illustrating various strain sensors that may be applied to a deformable fingerprint recognition device according to other embodiments.

Figure 11A:
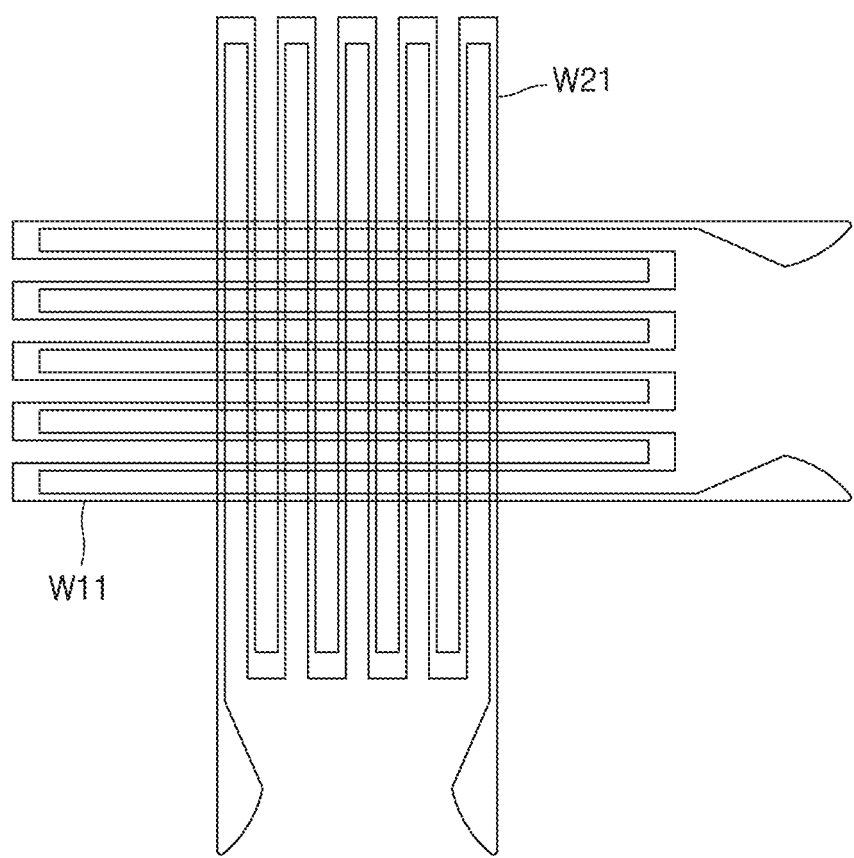
FIGS. 11A, 11B, 11C, and 11D are plan views illustrating various strain sensors that may be applied to a deformable fingerprint recognition device according to other embodiments.

Referring to FIG. 11A, a first wiring pattern W11 extending in an X-axis direction and a second wiring pattern W21 extending in a Y-axis direction may be arranged to cross each other in one cell region. An insulating layer may be placed between the first and second wiring patterns W11 and W21. Deformation in the X-axis and Y-axis directions may be measured using these unit strain sensor portions.

Figure 11B:
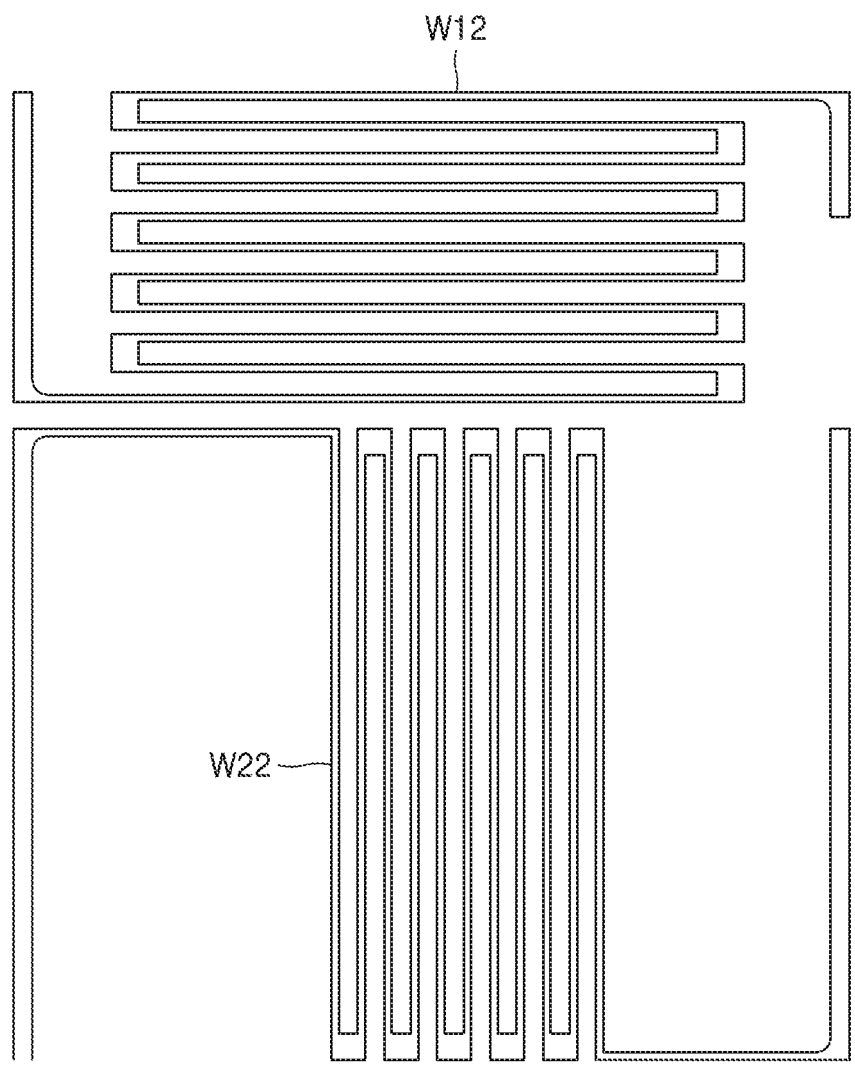

Referring to FIG. 11B, a first wiring pattern W12 extending in the X-axis direction and a second wiring pattern W22 extending in the Y-axis direction may be arranged so as not to overlap each other in one cell region. In this case, the first and second wiring patterns W12 and W22 may be arranged at the same level.

Figure 11C:
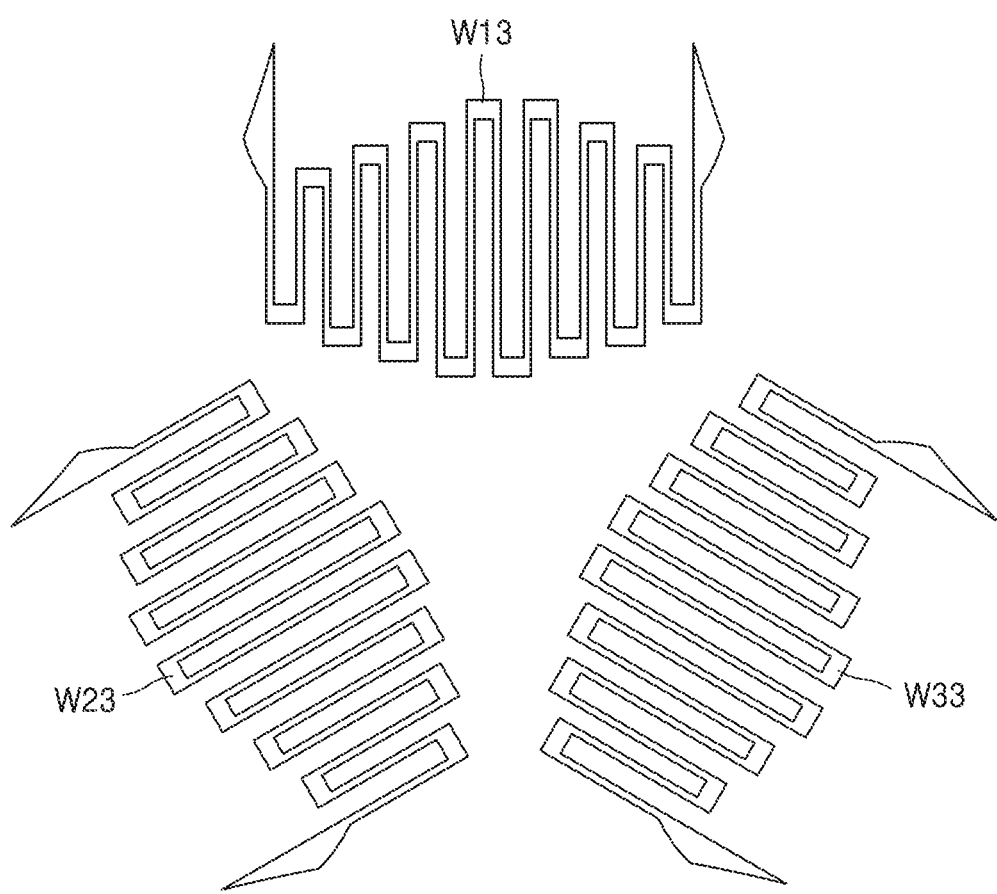

Referring to FIG. 11C, three wiring patterns W13, W23, and W33 may be arranged at an angle of about 60° from each other. The three wiring patterns W13, W23, and W33 may be disposed at the three vertices of an equilateral triangle.

Figure 11D:
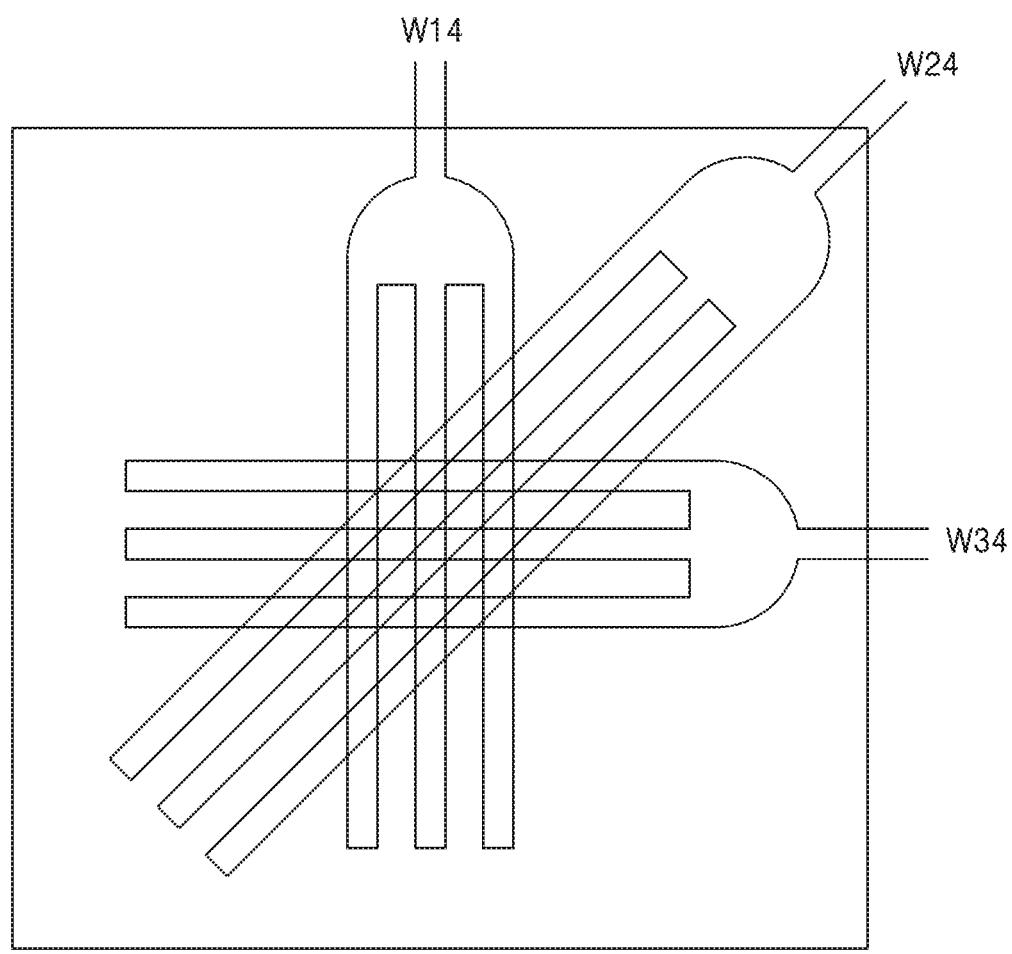

Referring to FIG. 11D, a plurality of wiring patterns W14, W24, and W34 extending in different directions may be arranged to overlap with each other.

The degree of deformation of the deformable fingerprint recognition device in the X-axis and Y-axis directions may be easily measured by using such various unit strain sensors as illustrated in FIGS. 11A to 11D. Even when the degree of deformation is measured without measuring the directivity of the deformation, the directivity of the deformation may be found by combining pieces of information obtained from a plurality of pixel regions (second pixel regions) of a strain sensor.

A sensor configured to sense the distribution of strain from a plurality of pixel regions (second pixel regions) may be variously constructed. A transparent or stretchable strain sensor may be constructed. In addition, a first-type strain sensor and a second-type strain sensor may be used in combination.

Figure 12:
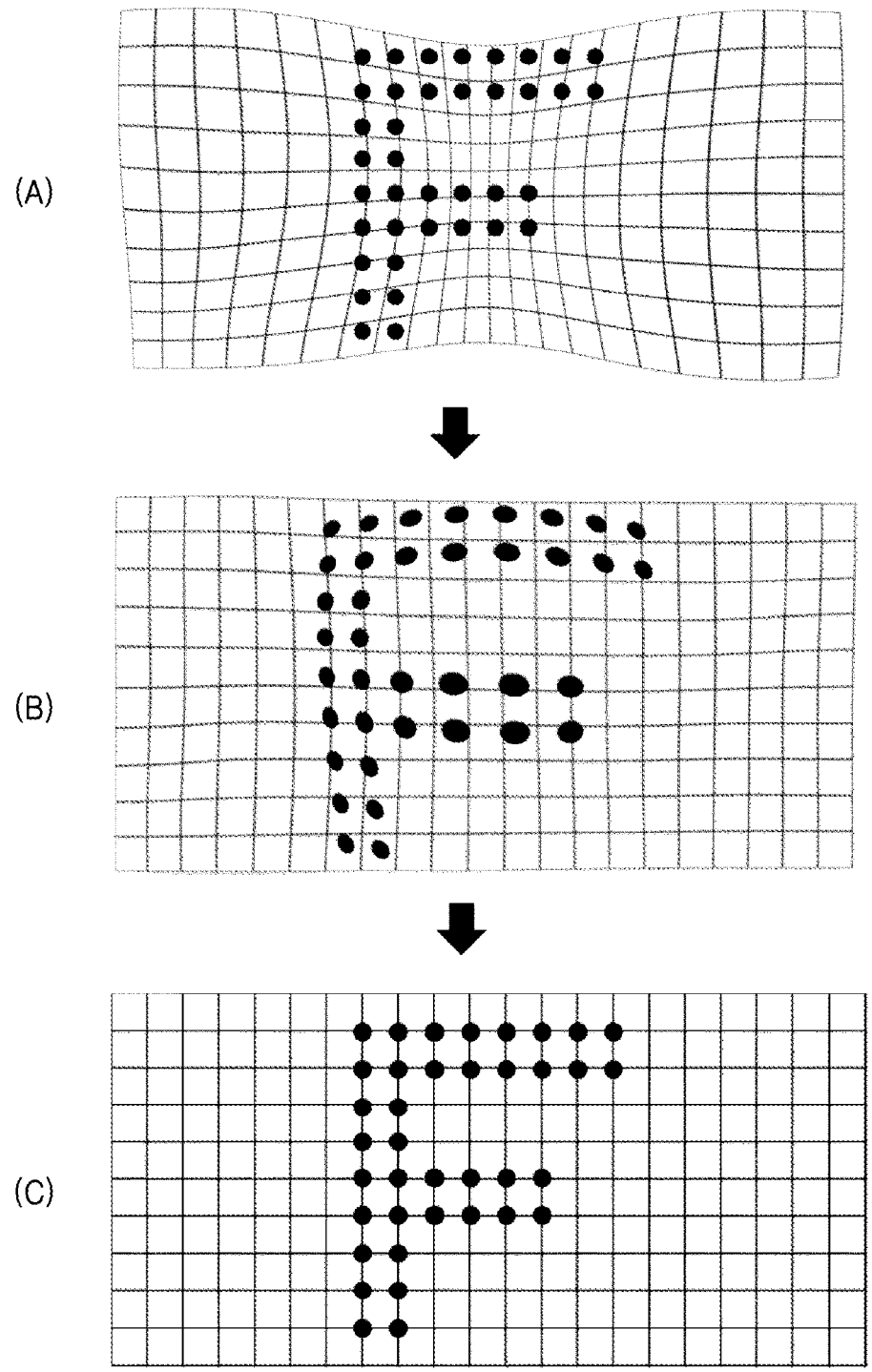
FIG. 12 is a schematic view illustrating a fingerprint authentication method using a deformable fingerprint recognition device according to an embodiment.

FIG. 12 is a schematic view illustrating a fingerprint authentication method using a deformable fingerprint recognition device according to an embodiment.

Image (A) of FIG. 12 illustrates the case in which fingerprint information is measured using a deformed fingerprint sensor. The points shown in FIG. 12 may be understood as characteristic points corresponding to fingerprint information.

When a fingerprint is recognized using a deformed fingerprint sensor, a fingerprint pattern deformed according to the shape of the deformed fingerprint sensor is obtained. The points shown in Image (B) of FIG. 12 may be understood as characteristic points corresponding to the deformed fingerprint pattern.

In this embodiment, the distribution of deformation of the fingerprint sensor is measured using a strain sensor, and the deformed fingerprint pattern may be corrected to be substantially the same as the actual fingerprint pattern by reflecting information about the distribution of deformation of the fingerprint sensor. The points shown in Image (c) of FIG. 12 may be understood as characteristic points substantially corresponding to the actual fingerprint pattern. Since information about the deformation of the fingerprint sensor is known, a signal detected in the deformed state may be calibrated to obtain a signal that might be detected in a non-deformed state (with the same resolution and magnitude). Therefore, accurate fingerprint authentication may be possible regardless of the degree or state of deformation of the fingerprint sensor.

Figure 13A:
FIG. 13A is a view illustrating an image of an actual fingerprint.
Figure 13B:
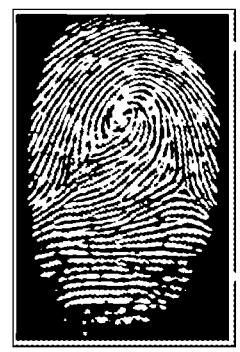
FIG. 13B is a view illustrating a fingerprint image obtained using a deformed fingerprint sensor.

FIG. 13A illustrates an image of a real fingerprint, and FIG. 13B illustrates a fingerprint image obtained using a deformed fingerprint sensor. Due to deformation of the fingerprint sensor, the fingerprint image is also deformed.

Figure 14A:
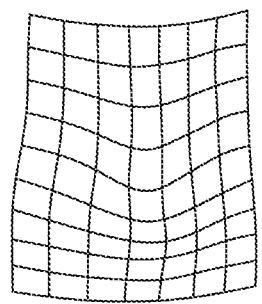
FIG. 14A is a view illustrating deformation distribution of the deformed fingerprint sensor obtained from a pixel array of a strain sensor.
Figure 14B:
FIG. 14B is a view illustrating a fingerprint image recovered (corrected) to be a fingerprint image that might be obtained from the fingerprint sensor in a non-deformed state, the fingerprint image being obtained by reflecting the deformation distribution of the fingerprint sensor.

FIG. 14A illustrates the distribution of deformation of the fingerprint sensor obtained from a pixel array of a strain sensor, and FIG. 14B illustrates a fingerprint image recovered (corrected) to be a fingerprint image that may be obtained from the fingerprint sensor in a non-deformed state, the fingerprint image being obtained by reflecting the distribution of deformation of the fingerprint sensor. The restored (corrected) fingerprint image in FIG. 14B may be the same or substantially the same as the real fingerprint image in FIG. 13A.

For rigid fingerprint devices of the related art, there is a method of predicting deformation of a finger using software and correcting a distorted fingerprint image using the predicted deformation. However, this method is for rigid fingerprint devices and requires a considerable amount of calculations, and it is difficult to apply this method to mobile devices or wearable devices. Embodiments of the present application may be applied to deformable fingerprint recognition devices and may be easily applied to mobile/wearable devices because of a markedly reduced amount of calculations.

Figure 15:
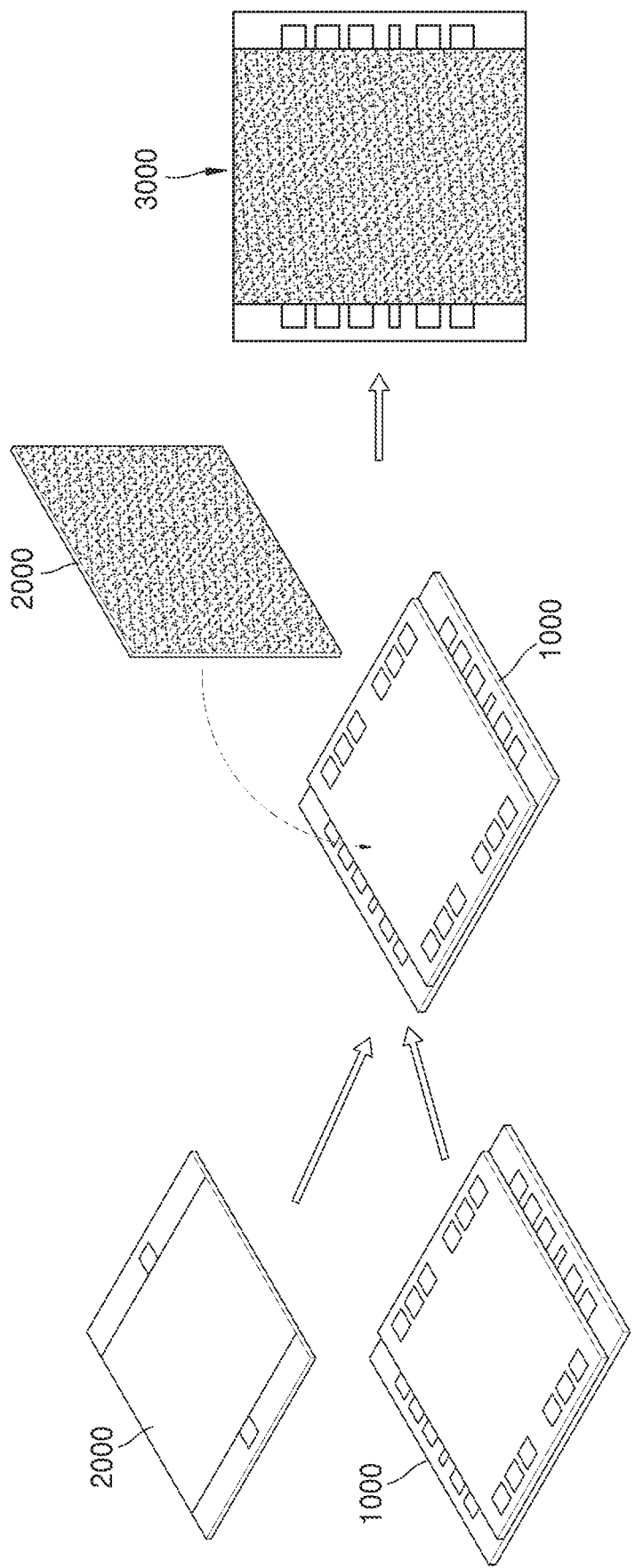
FIG. 15 is a view illustrating a method of fabricating a deformable fingerprint recognition device according to an embodiment.

FIG. 15 is a view illustrating a method of fabricating a deformable fingerprint recognition device according to an embodiment.

Figure 17:
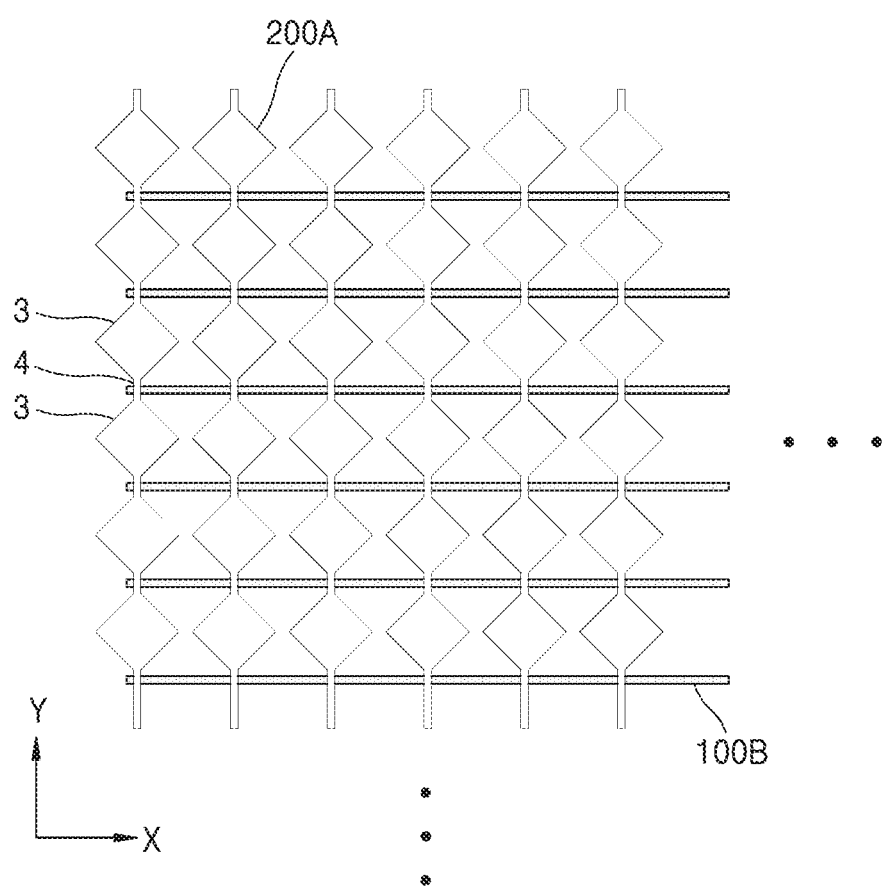
FIG. 17 is a plan view illustrating structures of a plurality of first electrodes and a plurality of second electrodes which are applicable to a deformable fingerprint recognition device according to another embodiment.

Referring to FIG. 15, a deformable fingerprint sensor 1000 including a plurality of first pixel regions may be formed on a first substrate. A strain sensor 2000 including a plurality of second pixel regions may be formed on a second substrate. Next, a deformable fingerprint recognition device 3000 may be fabricated by coupling (bonding) the deformable fingerprint sensor 1000 and the strain sensor 2000 to each other. The structures of the deformable fingerprint sensor 1000, the strain sensor 2000, and the deformable fingerprint recognition device 3000 illustrated in FIG. 17 are examples and may be modified.

In addition, FIG. 15 illustrates the case in which the deformable fingerprint sensor 1000 and the strain sensor 2000 are separately formed and then combined together to fabricate the deformable fingerprint recognition device 3000. In another embodiment, however, a deformable fingerprint recognition device may be fabricated by sequentially stacking (integrating) a strain sensor array and a fingerprint sensor array on one substrate.

Figure 16:
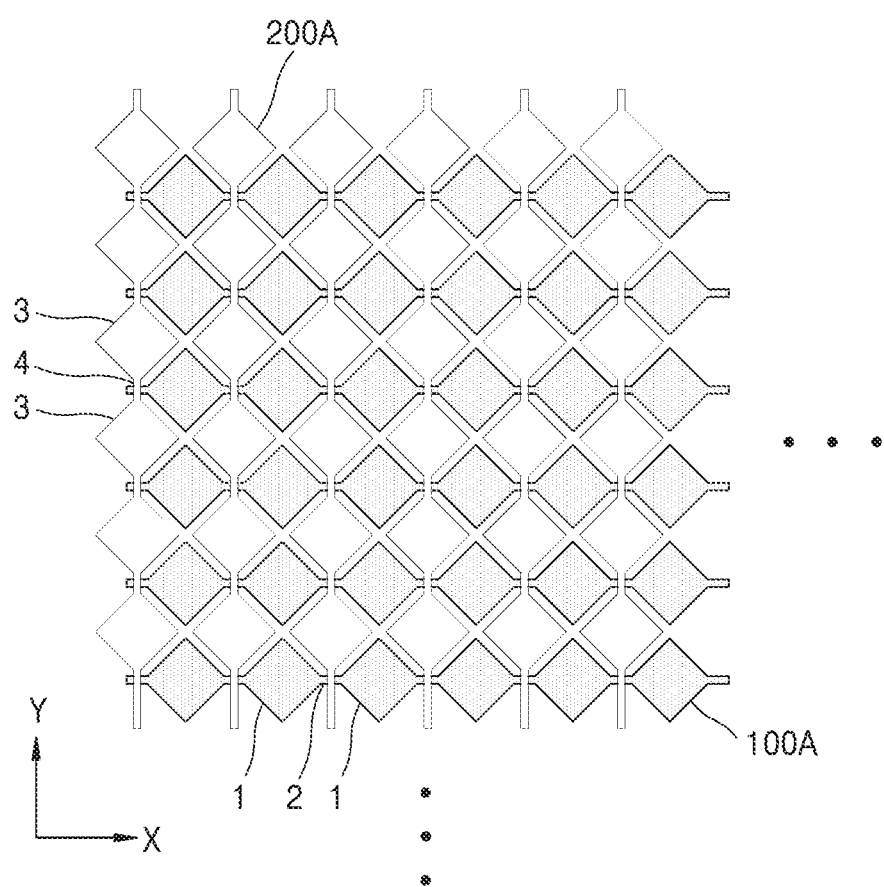
FIG. 16 is a plan view illustrating structures of a plurality of first electrodes and a plurality of second electrodes which are applicable to a deformable fingerprint recognition device according to an embodiment.

FIG. 16 is a plan view illustrating structures of a plurality of first electrodes 100A and a plurality of second electrodes 200A which are applicable to a deformable fingerprint recognition device according to an embodiment.

Referring to FIG. 16, the deformable fingerprint recognition device may include: the plurality of first electrodes 100A extending in a first direction, for example, an X-axis direction; and the plurality of second electrodes 200A extending in a second direction, for example, a Y-axis direction. The plurality of first electrodes 100A and the plurality of second electrodes 200A may be alternately disposed in an oblique direction which is oblique to the first direction and the second direction. The oblique direction may have ±45 degrees with each of the first direction and the second direction. The plurality of first electrodes 100A may include: a plurality of rhombus pattern portions 1; and connection portions 2 between the plurality of rhombus pattern portions 1. Similarly, the plurality of second electrodes 200A may include: a plurality of rhombus pattern portions 3 and connection portions 4 between the plurality of rhombus pattern portions 3. The connection portions 4 of the plurality of second electrodes 200A may be arranged to correspond to the connection portions 2 of the plurality of first electrodes 100A. An insulating layer (dielectric layer) may be provided between the plurality of first electrodes 100A and the plurality of second electrodes 200A. Capacitance, i.e., mutual capacitance, may be formed between the plurality of first electrodes 100A and the plurality of second electrodes 200A. For example, the plurality of first and second electrodes 100A and 200A may include a transparent conductive oxide (TCO), such as indium tin oxide (ITO), indium zinc oxide (IZO), aluminum zinc oxide (AZO), gallium zinc oxide (GZO), aluminum gallium zinc oxide (AGZO), or gallium indium zinc oxide (GIZO). In FIG. 16, the plurality of first and second electrodes 100A and 200A are illustrated as including the rhombus pattern portions 3 and 4 and the connection portions 2 and 4 therebetween. However, this is an example, and the structures of the plurality of first and second electrodes 100A and 200A may be variously modified. The plurality of first and second electrodes 100A and 200A may have polygonal pattern portions instead of having rhombus pattern portions, and at least one of the plurality of first and second electrodes 100A and 200A may be line patterns.

FIG. 17 is a plan view illustrating structures of a plurality of first electrodes 100B and a plurality of second electrodes 200A which are applicable to a deformable fingerprint recognition device according to another embodiment.

Referring to FIG. 17, the deformable fingerprint recognition device may include: the plurality of first electrodes 100B extending in an X-axis direction; and the plurality of second electrodes 200A extending in a Y-axis direction crossing the X-axis direction. The plurality of first electrodes 100B may be line patterns, and the plurality of second electrodes 200A may include a plurality of rhombus pattern portions 3 and connection portions 4 between the plurality of rhombus pattern portions 3.

The plurality of first electrodes 100B may include a metal, an alloy, or a metal compound. Since the plurality of first electrodes 100B may have a width of several micrometers (µm) or less, the plurality of first electrodes 100B may appear transparent to the naked eye even when the plurality of first electrodes 100B include a metal. In some cases, the plurality of first electrodes 100B may include a transparent electrode material. The plurality of second electrodes 200A may include a transparent conductive oxide like the plurality of second electrodes 200A shown in FIG. 17. In the present embodiment, the plurality of first electrodes 100B, which are line patterns, may have high electrical conductivity, and the plurality of second electrodes 200A having the rhombus pattern portions 3 may guarantee transparency. Accordingly, the prevent embodiment may guarantee high electrical conductivity and high transparency.

Figure 18:
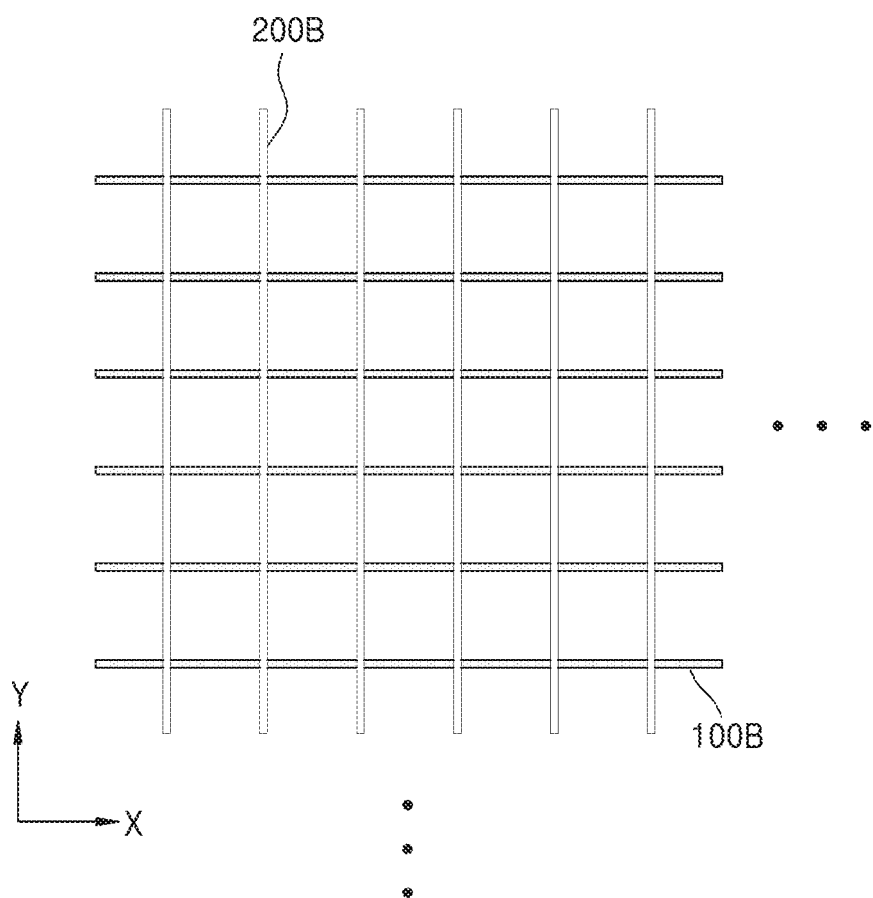
FIG. 18 is a plan view illustrating structures of a plurality of first electrodes and a plurality of second electrodes which are applicable to a deformable fingerprint recognition device according to another embodiment.

FIG. 18 is a plan view illustrating structures of a plurality of first electrodes 100B and a plurality of second electrodes 200B which are applicable to a deformable fingerprint recognition device according to another embodiment.

Referring to FIG. 18, the deformable fingerprint recognition device may include: the plurality of first electrodes 100B extending in an X-axis direction; and the plurality of second electrodes 200B extending in a Y-axis direction crossing the X-axis direction. The plurality of first electrodes 100B and the plurality of second electrodes 200A may be line patterns. The plurality of first electrodes 100B may be arranged at intervals of about several tens of micrometers (μm), for example, about 20 μm to about 120 μm. Similarly, the plurality of second electrodes 200B may be arranged at intervals of about several tens of micrometers (μm), for example, about 20 μm to about 120 μm.

In FIGS. 16 to 18, the plurality of first electrodes 100A and 100B and the plurality of second electrodes 200A and 200B may have flexibility or stretchability. That is, the plurality of first electrodes 100A and 100B and the plurality of second electrodes 200A and 200B may be flexible or stretchable. The plurality of first electrodes 100A and 100B and the plurality of second electrodes 200A and 200B may be formed on a flexible/stretchable substrate.

Figure 19:
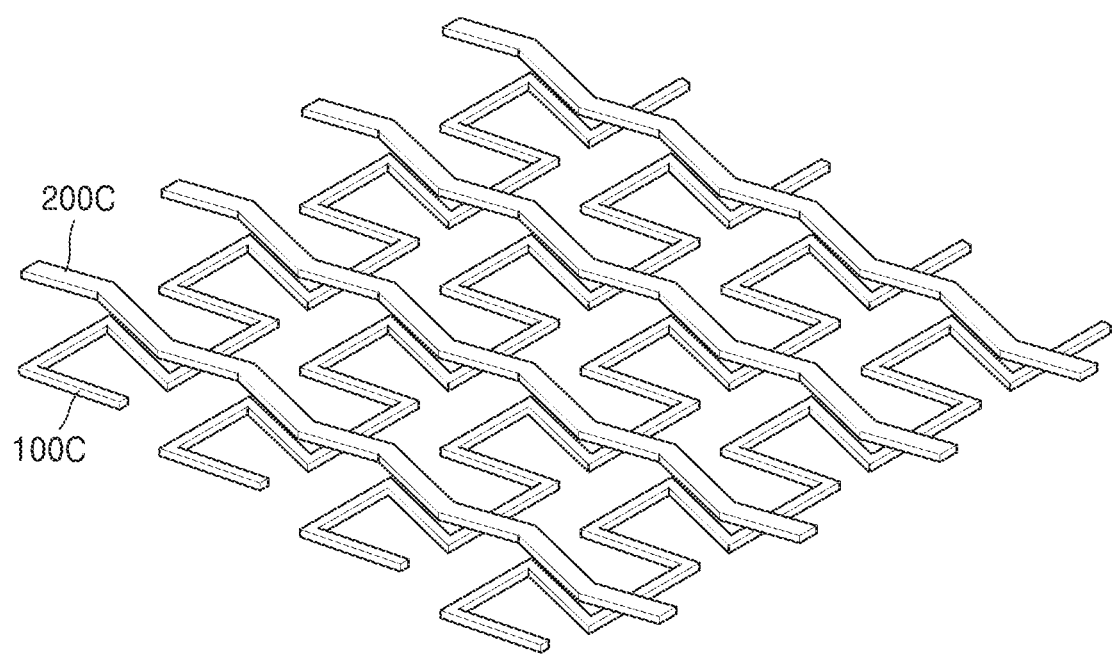
FIG. 19 is a perspective view illustrating structures of a plurality of first electrodes and a plurality of second electrodes which are applicable to a deformable fingerprint recognition device according to another embodiment.

FIG. 19 is a perspective view illustrating structures of a plurality of first electrodes 100C and a plurality of second electrodes 200C which are applicable to a deformable fingerprint recognition device according to another embodiment.

Referring to FIG. 19, the plurality of first electrodes 100C may extend in a first direction and may have a serpentine shape. Similarly, the plurality of second electrodes 200C may extend in a second direction and may have a serpentine shape. When the plurality of first electrodes 100C and the plurality of second electrodes 200C have a serpentine shape, the plurality of first electrodes 100C and the plurality of second electrodes 200C may be easily bent or deformed by tension.

Figure 20:
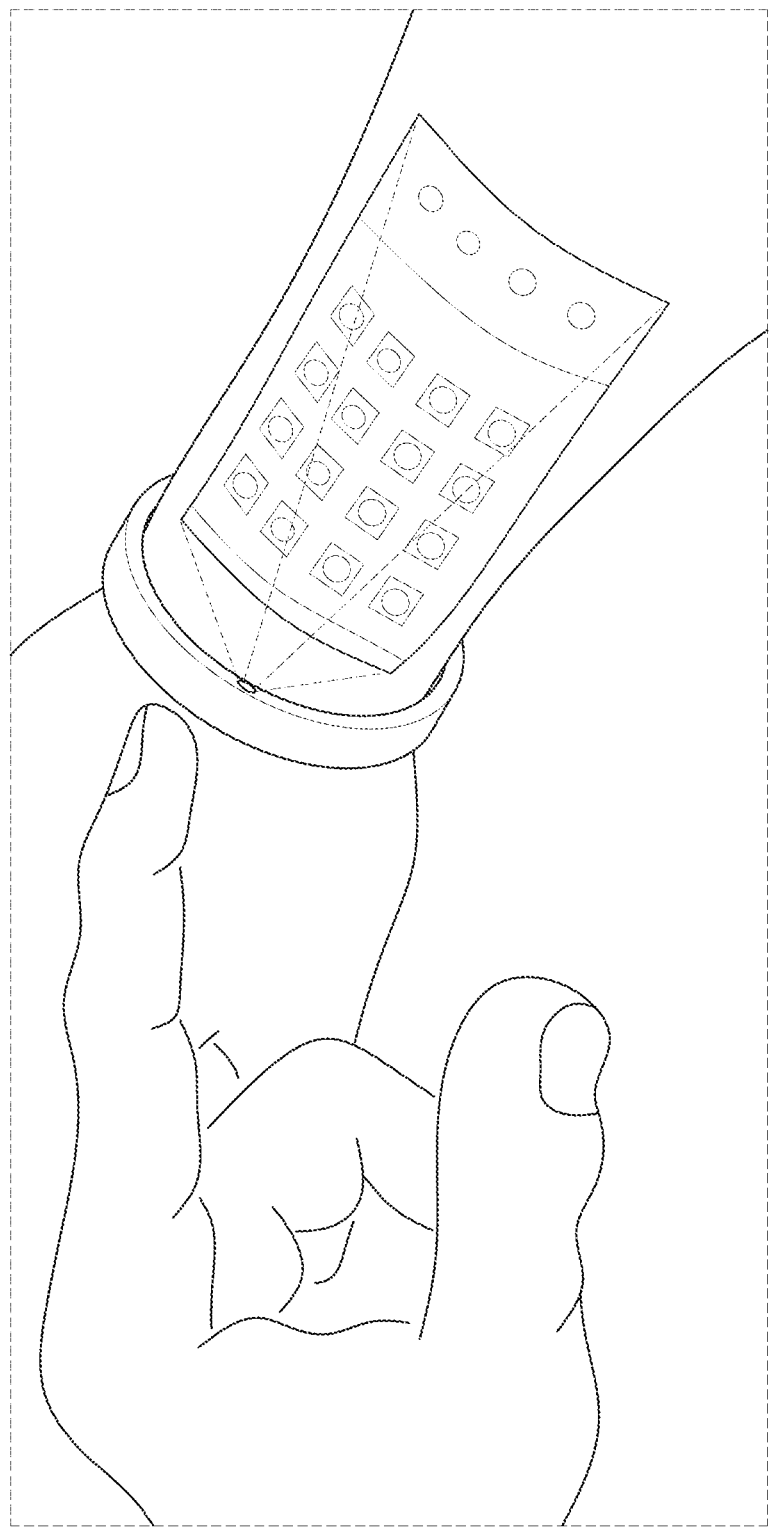
FIG. 20 is view illustrating example of flexible electronic device.

FIG. 20 is view illustrating example of flexible electronic apparatuse.

FIG. 20 illustrates a band-type electronic apparatus that may be put around a wrist, and an image may be projected on the skin of a user from the band-type electronic apparatus. Such a band-type electronic apparatus may be flexible/stretchable, and fingerprint recognition may be required for user authentication. Therefore, a fingerprint recognition device may also be required to be flexible for use in such band-type electronic apparatus.

Figure 21:
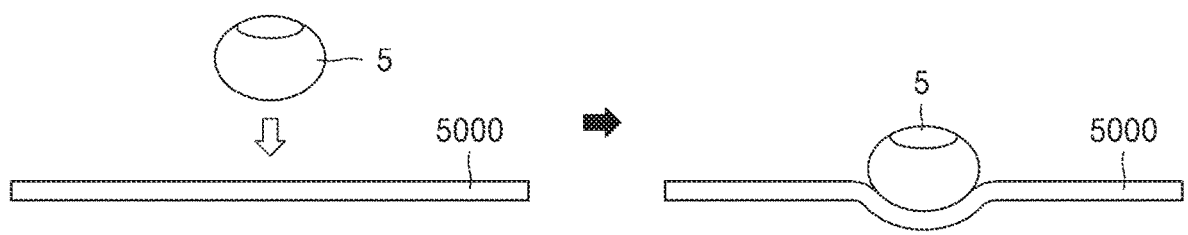
FIG. 21 is a cross-sectional view illustrating a process of authenticating a fingerprint in a flexible electronic device according to an example embodiment.

FIG. 21 is a cross-sectional view illustrating a process of authenticating a fingerprint in a flexible electronic apparatus 5000 according to an example embodiment.

Referring to FIG. 21, fingerprint authentication may be performed by brining a finger 5 into contact with the flexible electronic apparatus 5000 of the embodiment. At this time, the flexible electronic apparatus 5000 may be deformed conformally according to the shape of the finger 5. In this case, a fingerprint may be recognized in a three-dimensional form, and thus anti-spoofing (anti-deception/anti-counterfeiting) and accurate authentication may be guaranteed. When a fingerprint sensor deformed along the surface of the finger 5 recognizes a fingerprint, and the curvature of the deformation of the fingerprint sensor is recognized using a strain sensor, an obtained fingerprint image may be reconstructed in a three-dimensional (3D) form. When a fingerprint is recognized by touching a rigid device of the related art with the finger 5, the surface of the finger 5 is deformed. However, a three-dimensional fingerprint image may be obtained using the flexible electronic apparatus 5000 of the embodiment while reducing deformation of the finger 5.

The ideas of the embodiments may be applied not only to fingerprint recognition devices (fingerprint sensors) but also to other types of flexible/stretchable devices or sensors that acquire information based on a plurality of pixels. For example, the idea of the present disclosure may be applied to other types of sensors such as image sensors or pressure sensors in addition to fingerprint sensors. When applying the idea of the present disclosure to an image sensor, information about the curvature of the image sensor may be further measured. In addition, the deformable fingerprint recognition devices of the embodiments may be applied to touch-fingerprint complex sensors capable of sensing both a fingerprint and a touch of a user and may be applied to on-screen sensors.

It should be understood that the embodiments described herein should be considered in a descriptive sense only and not for purposes of limitation. Those skilled in the art will appreciate that the deformable fingerprint recognition devices, fingerprint authentication methods, and electronic apparatuses described with reference to FIGS. 1 through 21 may be variously modified. For example, the fingerprint sensors applied to the deformable fingerprint recognition devices may be variously modified, and the strain sensors applied to the deformable fingerprint recognition devices may be variously modified. Thus, the scope and spirit of the present disclosure are defined not by the descriptions of the embodiments but by the appended claims.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A deformable fingerprint recognition device comprising:
a fingerprint sensor configured to be deformable in shape; and a strain sensor disposed on the fingerprint sensor and configured to measure deformation distribution of the fingerprint sensor, wherein the deformable fingerprint recognition device is configured to recognize a fingerprint of a user based on a fingerprint detection of the fingerprint sensor and the deformation distribution.

2. The deformable fingerprint recognition device of claim 1, wherein the fingerprint sensor comprises a plurality of first pixel regions to detect the fingerprint of the user, and the strain sensor comprises a plurality of second pixel regions to measure the deformation distribution, wherein each of the plurality of second pixel regions corresponds to an n×m matrix array of the plurality of first pixel regions, where n refers to an integer equal to or greater than 1, and m refers to an integer equal to or greater than 1.

3. The deformable fingerprint recognition device of claim 2, wherein each of the plurality of second pixel regions corresponds to at least two of the plurality of first pixel regions.

4. The deformable fingerprint recognition device of claim 2, wherein the plurality of second pixel regions are arranged to entirely cover the plurality of first pixel regions.

5. The deformable fingerprint recognition device of claim 2, wherein the plurality of second pixel regions are arranged to selectively correspond to some of the plurality of first pixel regions, and at least some of the plurality of second pixel regions are apart from each other.

6. The deformable fingerprint recognition device of claim 1, wherein the fingerprint sensor comprises a capacitive fingerprint sensor.

7. The deformable fingerprint recognition device of claim 1, wherein the strain sensor comprises one of a capacitive strain sensor, a resistive strain sensor, and a piezoelectric strain sensor.

8. The deformable fingerprint recognition device of claim 1, wherein the fingerprint sensor comprises a plurality of first electrodes and a plurality of second electrodes crossing the plurality of first electrodes, and a plurality of first pixel regions are defined by cross points between the plurality of first electrodes and the plurality of second electrodes.

9. The deformable fingerprint recognition device of claim 8, wherein the strain sensor comprises a plurality of third electrodes and a plurality of fourth electrodes crossing the plurality of third electrodes, and a plurality of second pixel regions are defined by cross points between the plurality of third electrodes and the plurality of fourth electrodes.

10. The deformable fingerprint recognition device of claim 9, wherein the plurality of first electrodes are first transmit electrodes, the plurality of third electrodes are second transmit electrodes, and at least one of the plurality of first electrodes and at least one of the plurality of third electrodes are electrically connected to each other.

11. The deformable fingerprint recognition device of claim 9, wherein the plurality of first electrodes or the plurality of second electrodes are arranged with a first interval therebetween, the plurality of third electrodes or the plurality of fourth electrodes are arranged with a second interval therebetween, and the second interval is equal to or greater than the first interval.

12. The deformable fingerprint recognition device of claim 8, wherein the plurality of first electrodes and the plurality of second electrodes comprise a plurality of rhombus pattern portions and connection portions between the plurality of rhombus pattern portions.

13. The deformable fingerprint recognition device of claim 8, wherein: the plurality of first electrodes comprise a plurality of rhombus pattern portions and connection portions between the plurality of rhombus pattern portions, and the plurality of second electrodes comprise a plurality of electrode lines; or the plurality of first electrodes and the plurality of second electrodes comprise a plurality of electrode lines.

14. The deformable fingerprint recognition device of claim 8, wherein at least one of the plurality of first electrodes and the plurality of second electrodes has a serpentine shape.

15. The deformable fingerprint recognition device of claim 1, further comprising a shield layer disposed between the fingerprint sensor and the strain sensor.

16. The deformable fingerprint recognition device of claim 1, wherein the fingerprint sensor is disposed above the strain sensor, and a cover film covers the fingerprint sensor and is configured to recognize the fingerprint of the user when the cover film is touched by the user.

17. A deformable fingerprint recognition device comprising:

a fingerprint sensor comprising a plurality of first electrodes, and a plurality of second electrodes crossing the plurality of first electrodes, and configured to detect a fingerprint of a user from cross points between the plurality of first electrodes and the plurality of second electrodes;

a strain sensor disposed on the fingerprint sensor to measure deformation distribution of the fingerprint sensor; and a processor configured to correct the fingerprint detected by the fingerprint sensor based on the deformation distribution of the fingerprint sensor.

18. The deformable fingerprint recognition device of claim 17, wherein the fingerprint sensor comprises a plurality of first pixel regions located at the cross points between the plurality of first electrodes and the plurality of second electrodes, wherein the strain sensor comprises a plurality of second pixel regions, wherein each of the plurality of second pixel regions corresponds to at least two of the plurality of first pixel regions and is configured to measure the deformation distribution from the corresponding at least two of the plurality of first pixel regions.

19. The deformable fingerprint recognition device of claim 17, wherein the plurality of first electrodes are disposed in a first direction, and the plurality of second electrodes are disposed in a second direction perpendicular to the first direction, and wherein the plurality of first electrodes and the plurality of second electrodes are alternately disposed in a direction oblique to the first direction and the second direction.

20. The deformable fingerprint recognition device of claim 17, wherein the strain sensor comprises one of a capacitive strain sensor, a resistive strain sensor, and a piezoelectric strain sensor.

21. A fingerprint authentication method using a deformable fingerprint recognition device, the deformable fingerprint recognition device comprising a fingerprint sensor configured to be deformable in shape, and a strain sensor disposed on the fingerprint sensor, the fingerprint authentication method comprising:
- acquiring information about a fingerprint of a user from the fingerprint sensor;
- measuring deformation distribution of the fingerprint sensor using the strain sensor; and
- correcting the information about the fingerprint of the user based on the deformation distribution of the fingerprint sensor.

\* \* \* \* \*